US006798952B2

(12) United States Patent
Naruse

(10) Patent No.: US 6,798,952 B2
(45) Date of Patent: Sep. 28, 2004

(54) OPTICAL MULTIPLEXER/DEMULTIPLEXER

(75) Inventor: Terukazu Naruse, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 243 days.

(21) Appl. No.: 10/150,997

(22) Filed: May 21, 2002

(65) Prior Publication Data

US 2003/0103722 A1 Jun. 5, 2003

(30) Foreign Application Priority Data

Dec. 4, 2001 (JP) .................................. 2001-370519

(51) Int. Cl.$^7$ .............................................. G02B 6/26
(52) U.S. Cl. ........................ 385/37; 385/24; 385/27; 385/39; 385/43; 385/46; 385/83; 385/130
(58) Field of Search ............................... 385/15–17, 20, 385/24, 27, 28, 31, 37, 39, 43, 46, 47, 55–56, 76–77, 83, 88–92, 130

(56) References Cited

U.S. PATENT DOCUMENTS

| | | | | |
|---|---|---|---|---|
| 4,756,587 A | * | 7/1988 | Sano et al. ................... 385/27 |
| 5,136,671 A | * | 8/1992 | Dragone ...................... 385/46 |
| 5,467,418 A | * | 11/1995 | Dragone ...................... 385/37 |
| 5,488,680 A | * | 1/1996 | Dragone ...................... 385/24 |
| 5,623,571 A | * | 4/1997 | Chou et al. ................. 385/130 |
| 5,706,377 A | * | 1/1998 | Li .............................. 385/37 |
| 5,745,616 A | * | 4/1998 | Zirngibl ...................... 385/37 |
| 5,745,618 A | * | 4/1998 | Li .............................. 385/46 |
| 5,841,919 A | * | 11/1998 | Akiba et al. ................. 385/37 |
| 5,881,199 A | * | 3/1999 | Li ............................. 385/140 |
| 5,982,960 A | * | 11/1999 | Akiba et al. ................. 385/24 |
| 5,999,290 A | * | 12/1999 | Li .............................. 398/83 |
| 6,069,990 A | * | 5/2000 | Okawa et al. ................ 385/43 |
| 6,205,273 B1 | * | 3/2001 | Chen .......................... 385/37 |
| 6,222,963 B1 | * | 4/2001 | Grand et al. ................. 385/39 |
| 6,229,943 B1 | * | 5/2001 | Okayama ..................... 385/39 |
| 6,363,188 B1 | * | 3/2002 | Alphonse ..................... 385/37 |
| 2003/0081898 A1 | * | 5/2003 | Tabuchi et al. ............... 385/37 |

OTHER PUBLICATIONS

Japanese Abstract, Pub. No. 09171112 A, dated Jun. 30, 1997 (1 pg.).

Japanese Abstract, Pub. No. 2000–147276, dated May 26, 2000 (1 pg.).

* cited by examiner

Primary Examiner—John R. Lee
Assistant Examiner—David A. Vanore
(74) Attorney, Agent, or Firm—Staas & Halsey

(57) ABSTRACT

An optical multiplexer/demultiplexer having a small-loss structure that uses an arrayed waveguide grating to optimally make the passband characteristic of demultiplexed light flat. An optical input waveguide and a sector slab waveguide are connected by a directional coupler. The directional coupler comprises a central waveguide including an end portion on the output side of the optical input waveguide and arranged waveguides which are arranged on both sides of the central waveguide and the exits of which are connected to the sector slab waveguide. A taper is formed on both side portions of the central waveguide so that the width of a core will gradually narrow in the direction of the exit, and the central waveguide is located so that this end portion will not touch the sector slab waveguide. The width of a core in each of the arranged waveguides is uniform. The arranged waveguides are arranged on both sides of the central waveguide by the same numbers so that the arranged waveguides will be parallel to the taper formed on the central waveguide. As a result, light from the central waveguide couples with the arranged waveguides.

12 Claims, 27 Drawing Sheets

OPTICAL MULTIPLEXER/DEMULTIPLEXER

BACKGROUND OF THE INVENTION (1) Field of the Invention

This invention relates to an optical multiplexer/demultiplexer comprising an arrayed waveguide grating and, more particularly, to an optical multiplexer/demultiplexer having a small-loss structure.

(2) Description of the Related Art

With an explosive increase in data traffic on networks, in recent years attention has been riveted to photonic networks on which a large amount of data can be transferred. To realize such networks, wavelength division multiplexing (WDM) optical communication networks are being built. An arrayed waveguide grating (AWG) in which the technology of a planar lightwave circuit (PLC) is adopted is a likely candidate for an optical wavelength multiplexer/demultiplexer essential to these WDM transmission systems.

FIG. 22 is a view showing the structure of a conventional arrayed waveguide grating.

As shown in FIG. 22, an arrayed waveguide grating 10 has the following waveguide structure. A sector slab waveguide 13 is connected to the output side of one or more optical input waveguides 12 arranged. An arrayed waveguide 14 is connected to the output side of the sector slab waveguide 13. A sector slab waveguide 15 is connected to the output side of the arrayed waveguide 14. A plurality of optical output waveguides 16 are connected to the output side of the sector slab waveguide 15. Usually the arrayed waveguide grating 10 is made by forming the above waveguide structure on, for example, a silicon substrate with cores made from siliceous glass or the like.

The sector slab waveguide 13 on the input side has the center of curvature at the end of the middle waveguide of the optical input waveguides 12. The sector slab waveguide 15 on the output side also has the center of curvature at the end of the middle waveguide of the optical output waveguides 16. The sector slab waveguides 13 and 15 have a structure in which the optic axes of waveguides in the arrayed waveguide 14 are located radially from the center of curvature. As a result, the optical arrangement of the sector slab waveguide 13 and arrayed waveguide 14 and of the sector slab waveguide 15 and arrayed waveguide 14 is the same as that of a concave mirror. That is to say, they will function the same as a lens. Moreover, in the arrayed waveguide 14, there is optical path length difference ΔL between any two adjacent waveguides.

For example, the number of the optical input waveguides 12 and optical output waveguides 16 located corresponds to that of signal light beams with different wavelengths which are obtained as a result of demultiplexing by the arrayed waveguide grating 10 or which are to be multiplexed by the arrayed waveguide grating 10. Moreover, usually the arrayed waveguide 14 includes a large number of waveguides. In FIG. 22, for the sake of simplicity, only one optical input waveguide 12 is shown and the number of waveguides included in the arrayed waveguide 14 and optical output waveguide 16 is reduced.

If the arrayed waveguide grating 10 functions as an optical demultiplexer, light with a plurality of wavelengths λ1, λ2, ..., λn is multiplexed by a WDM system and is input from the optical input waveguide 12 to the sector slab waveguide 13. This wavelength-multiplexed light spreads in the sector slab waveguide 13 by diffraction and is spreaded to each of the waveguides of the arrayed waveguide 14. In this case, the phases of light distributed to the waveguides of the arrayed waveguide 14 are the same. The light beams which propagated through the arrayed waveguide 14 are given phase difference corresponding to optical path length difference ΔL between adjacent waveguides, interfere with one another in the sector slab waveguide 15 on the output side, and are condensed into the optical output waveguides 16. In this case, phase difference given in the arrayed waveguide 14 depends on the wavelengths, so the wavelengths are dispersed and the signal light beams are condensed into the different optical output waveguides 16 according to their wavelengths. As a result, the wavelength-multiplexed light input from the optical input waveguides 12 is demultiplexed into light with wavelengths of λ1, λ2, ..., λn and is output from the different optical output waveguides 16.

Operation in the arrayed waveguide grating 10 is reversible. That is to say, if the direction in which light travels is inverted, the arrayed waveguide grating 10 will function as an optical multiplexer. Intervals Δλ between the wavelengths of light obtained by demultiplexing are given approximately by:

$$\Delta\lambda = (ns \cdot d \cdot nc)/(f \cdot m \cdot ng) \cdot \Delta x \quad (1)$$

where ns is an effective refractive index in the sector slab waveguides 13 and 15, d is a waveguide pitch at a portion where the arrayed waveguide 14 and sector slab waveguide 13 connect and at a portion where the arrayed waveguide 14 and sector slab waveguide 15 connect, nc is an effective refractive index in each of the waveguides of the arrayed waveguide 14, f is the focal length of the sector slab waveguides 13 and 15, m is a diffraction degree, ng is a group index in the arrayed waveguide 14, and Δx is an interval between adjacent optical output waveguides 16. If a center wavelength is λ0, then m=(nc·ΔL)/λ0.

FIG. 23 is a graph showing an example of the passband characteristic of light demultiplexed in the above arrayed waveguide grating 10.

The passband characteristic of light obtained in each of the optical output waveguides 16 in the case of the arrayed waveguide grating 10 shown in FIG. 22 being used as an optical demultiplexer is shown in FIG. 23. In this case, the intensity of light obtained in each optical output waveguide 16 is highest at center wavelength λ0 and becomes significantly lower at a wavelength farther from the center wavelength λ0. In actual optical communication systems, however, moderately wide wavelength range R with the center wavelength λ0 as its center will be used and there will be fluctuations in the wavelength of light propagating. As a result, with the above passband characteristic, the intensity of light obtained varies according to its wavelengths. In this case, shift D0 will occur. Therefore, a passband characteristic must be made flat so that the intensity of light obtained in the used wavelength range R will be constant.

FIG. 24 is a graph showing an example in which a passband characteristic is made flat.

On a graph shown in FIG. 24, a spectrum is flat in the used wavelength range R with the center wavelength λ0 as its center. The intensity of light obtained is almost constant in this range and shift D1 in the intensity of the light is slight.

Conventionally, a Y branch circuit has been located at a portion where the optical input waveguide 12 and sector slab waveguide 13 connect in order to obtain light of constant intensity in the used wavelength range R. FIG. 25 is a view showing the structure of a Y branch circuit. FIG. 26 is a schematic view showing the shape of a mode of light output from the Y branch circuit to the sector slab waveguide 13. The x-axis in FIG. 26 is perpendicular to the waveguides of the optical input waveguide 12 or the arrayed waveguide 14.

As shown in FIG. 25, a Y branch circuit 17 has the shape of the letter "Y" and is located at a portion where the optical input waveguide 12 and sector slab waveguide 13 connect. As a result, when single mode light which propagated through the optical input waveguide 12 is radiated into the sector slab waveguide 13 via the Y branch circuit 17, two peaks as shown in FIG. 26 will appear side by side in the shape of its mode. Therefore, two peaks also appear in the shape of a mode of light which is input from the sector slab waveguide 13 on the input side to the sector slab waveguide 15 on the output side through the arrayed waveguide 14 and which is condensed.

There is one peak at the center wavelength λ0 in the shape of a mode of the optical output waveguides 16. In optical coupling of the shape of this mode and the shape of a mode of the sector slab waveguide 15 in which two peaks appear, a passband characteristic will be estimated approximately by an overlap integral of the two modes. Therefore, as shown by the graph in FIG. 24, in the optical output waveguides 16 light of constant intensity can be obtained in the used wavelength range R with the center wavelength λ0 as its center.

With the above arrayed waveguide grating 10, however, excess loss will occur to output light by locating the Y branch circuit 17 at a portion where the optical input waveguide 12 and sector slab waveguide 13 connect. As shown in FIG. 25, this excess loss will increase with gap width W formed at a portion where the Y branch circuit 17 branches.

FIG. 27 is a graph showing the relationship between gap width W and excess loss in the Y branch circuit 17.

As shown in FIG. 27, excess loss caused by the Y branch circuit 17 increases in proportion to the gap width W. A gap several micrometers in width will be always formed in the Y branch circuit 17 for reasons of manufacture. Therefore, if the Y branch circuit 17 is used to make passband characteristics in the optical output waveguides 16 flat, it is impossible to reduce the amount of excess loss significantly.

In addition to this, with the arrayed waveguide grating 10 having the above structure, connection loss will occur between the sector slab waveguide 13 on the input side and the arrayed waveguide 14 regardless of whether a mode of input light is converted to make the passband characteristics of output light flat. The reason for the occurrence of this connection loss is as follows.

The shape of a mode of light input from the sector slab waveguide 13 to the arrayed waveguide 14 spreads significantly and horizontally. In contrast, the width of the shape of a mode of each waveguide of the arrayed waveguide 14 corresponds to that of a core, that is to say, the shape of a mode of each waveguide of the arrayed waveguide 14 is narrow. Therefore, the shape of a mode of the arrayed waveguide 14 obtained by synthesizing the shape of modes of all the waveguides of the arrayed waveguide 14 differs significantly from that of a mode of the sector slab waveguide 13. That is to say, the shape of a mode of the sector slab waveguide 13 does not match the shape of a mode of the arrayed waveguide 14. As a result, connection loss the amount of which corresponds to the difference between the shape of the two modes will occur.

SUMMARY OF THE INVENTION

The present invention was made under the background circumstances as described above. An object of the present invention is to provide an optical multiplexer/demultiplexer which can optimally make the passband characteristics of demultiplexed light flat by a small-loss structure.

Another object of the present invention is to provide an optical multiplexer/demultiplexer which can multiplex/demultiplex wavelength-multiplexed light by a small-loss structure.

In order to achieve the above objects, an optical multiplexer/demultiplexer having a waveguide structure comprising one or more optical input waveguides arranged, a first sector slab waveguide located on the output side of the optical input waveguides, an arrayed waveguide including a plurality of waveguides arranged any adjacent two of which differ in length by a constant value for propagating light output from the first sector slab waveguide, a second sector slab waveguide connected to the output side of the arrayed waveguide, and a plurality of optical output waveguides arranged and connected to the output side of the second sector slab waveguide is provided. In this optical multiplexer/demultiplexer, the optical input waveguides and the first sector slab waveguide are connected by a directional coupler having a symmetrical structure comprising a central waveguide including an end portion on the first sector slab waveguide side of the optical input waveguides on both side portions of which a taper is formed so that the width of a core will gradually narrow in the direction of the end portion, and not touching the first sector slab waveguide and a plurality of arranged waveguides one end of each of which is connected to the input side of the first sector slab waveguide and which are arranged on both sides of the central waveguide by the same numbers.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will now be described with reference to the drawings.

Figure 2:
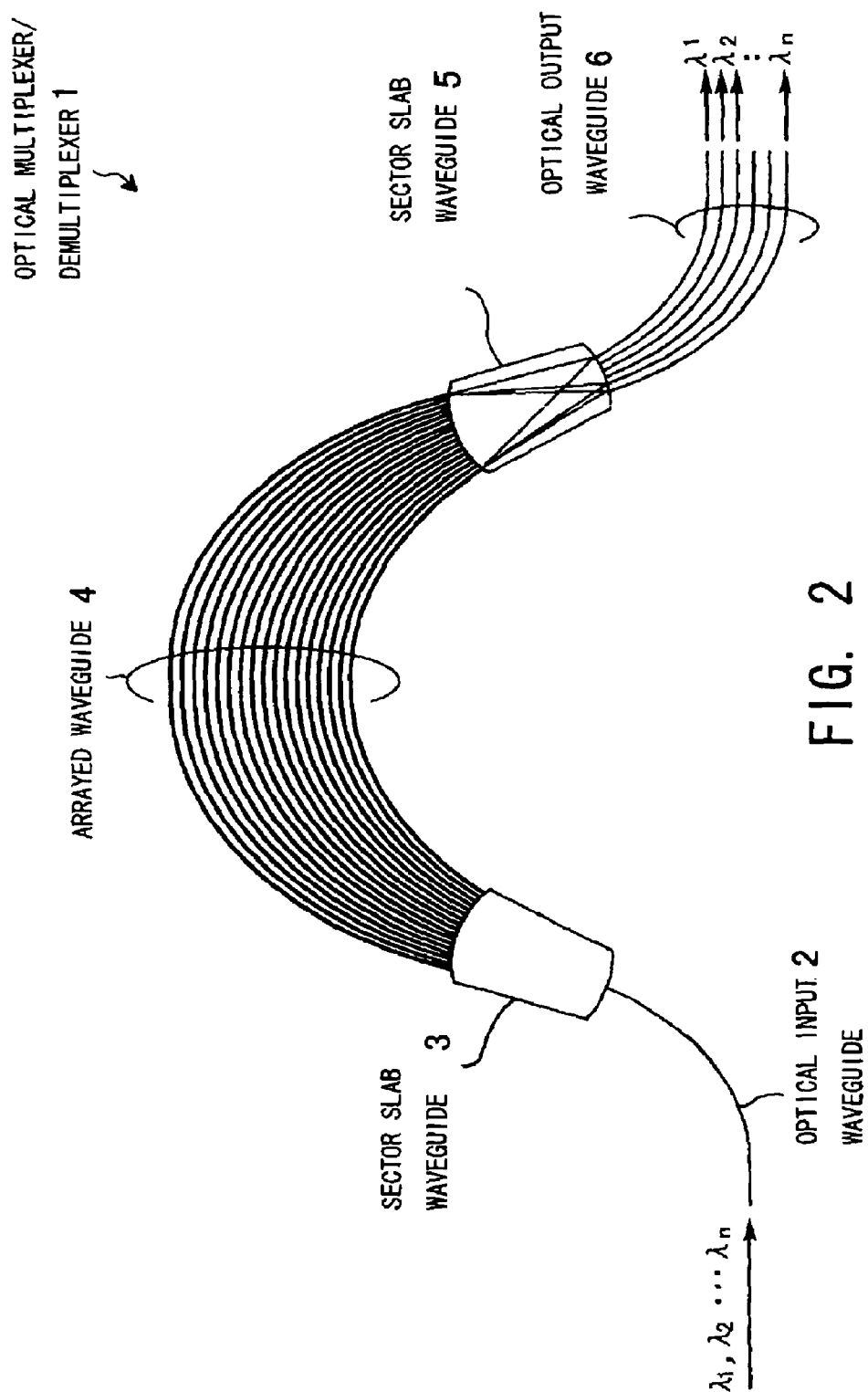
FIG. 2 is a view showing the entire structure of an optical multiplexer/demultiplexer according to the present invention.

FIG. 2 is a view showing the entire structure of an optical multiplexer/demultiplexer according to the present invention.

As shown in FIG. 2, an optical multiplexer/demultiplexer 1 according to the present invention basically comprises an arrayed waveguide grating having a waveguide structure including one or more optical input waveguides 2 arranged, a sector slab waveguide 3 located on the output side of the optical input waveguides 2, an arrayed waveguide 4 connected to the output side of the sector slab waveguide 3, a sector slab waveguide 5 connected to the output side of the arrayed waveguide 4, and a plurality of optical output waveguides 6 connected to the output side of the sector slab waveguide 5. Furthermore, the optical input waveguides 2 and sector slab waveguide 3 connect by a directional coupler (not shown) described later. This waveguide structure is realized by, for example, forming a core on a substrate made from silicon or the like by the use of siliceous glass or the like.

If light with wavelengths of $\lambda 1, \lambda 2, \ldots, \lambda n$ is multiplexed and is input via the optical input waveguide 2, then the optical multiplexer/demultiplexer 1 will function as an optical demultiplexer which demultiplexes this light and outputs light with wavelengths of $\lambda 1, \lambda 2, \ldots, \lambda n$ to each waveguide of the optical output waveguides 6. In addition, operation in the optical multiplexer/demultiplexer 1 is reversible. That is to say, if the direction in which light travels is inverted, the optical multiplexer/demultiplexer 1 will function as an optical multiplexer.

The sector slab waveguide 3 on the input side has the center of curvature at the end of the middle waveguide of the optical input waveguides 2. The sector slab waveguide 5 on the output side also has the center of curvature at the end of the middle waveguide of the optical output waveguides 6. The sector slab waveguides 3 and 5 have a structure in which the optic axes of waveguides of the arrayed waveguide 4 are located radially from the center of curvature. As a result, the optical arrangement of the sector slab waveguide 3 and arrayed waveguide 4 and of the sector slab waveguide 5 and arrayed waveguide 4 is the same as that of a concave mirror. That is to say, they will function the same as a lens. Moreover, in the arrayed waveguide 4, there is optical path length difference $\Delta L$ between adjacent waveguides.

For example, the number of the optical input waveguides 2 and optical output waveguides 6 located corresponds to that of signal light beams with different wavelengths which are obtained as a result of demultiplexing by the optical multiplexer/demultiplexer 1 or which are to be multiplexed by the optical multiplexer/demultiplexer 1. Moreover, usually the arrayed waveguide 4 includes a large number of waveguides. In FIG. 2, for the sake of simplicity, only one optical input waveguide 2 is shown and the number of waveguides included in the arrayed waveguide 4 and optical output waveguides 6 is reduced.

If the optical multiplexer/demultiplexer 1 functions as an optical demultiplexer, basic operation is as follows. Wavelength-multiplexed light input from the optical input waveguide 2 to the sector slab waveguide 3 via a directional coupler (not shown) spreads in the sector slab waveguide 3 by diffraction and is spreaded to each of the waveguides of the arrayed waveguide 4. In this case, the phases of light distributed to the waveguides are the same. The signal light beams which propagated through the arrayed waveguide 4 are given phase difference corresponding to optical path length difference $\Delta L$ between adjacent waveguides, interfere with one another in the sector slab waveguide 5 on the output side, and are condensed into the optical output waveguides 6. In this case, phase difference given in the arrayed waveguide 4 depends on wavelengths, so wavelengths are dispersed and the signal light beams are condensed into the different optical output waveguides 6 according to their wavelengths. As a result, the wavelength-multiplexed light input from the optical input waveguide 2 is demultiplexed according to wavelengths and is output from the different optical output waveguides 6.

By the way, in actual optical communication systems in which the above optical multiplexer/demultiplexer 1 is used, a moderately wide wavelength range with a center wavelength as its center will be used for light with some wavelength. Moreover, in many cases, there occur fluctuations in the wavelength of light propagated. Therefore, it is desirable that the transmitted spectrum of light obtained in the optical output waveguides 6 has a flat passband characteristic in a wavelength range around a center wavelength. Therefore, in the present invention, a directional coupler is used to connect the optical input waveguide 2 and sector slab waveguide 3.

Figure 1A:
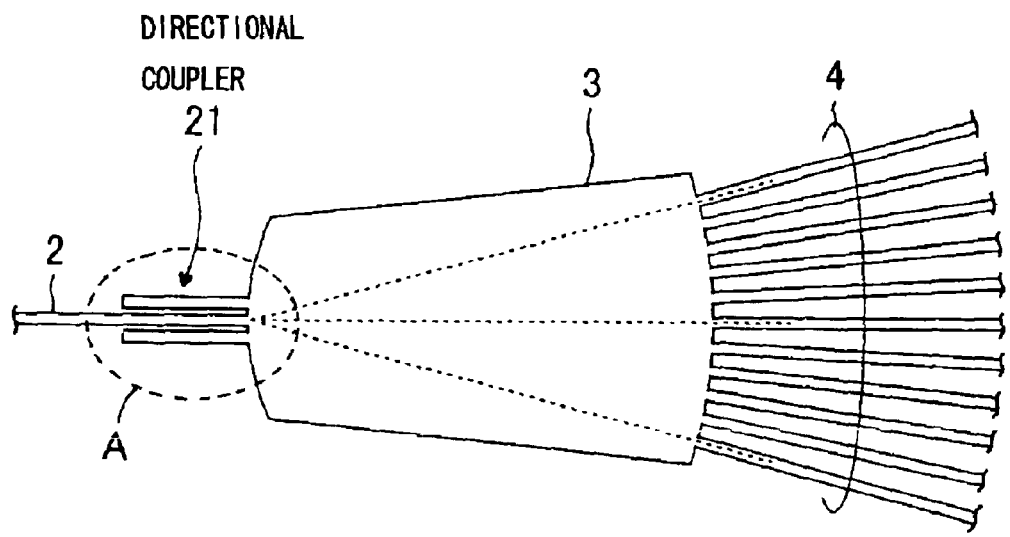
FIGS. 1(A) and 1(B) are views showing a first embodiment of a directional coupler applicable to the present invention, FIG. 1(A) showing positions where a directional coupler and the surrounding elements connect, FIG. 1(B) being an enlarged view of portion A shown in FIG. 1(A).
Figure 1B:
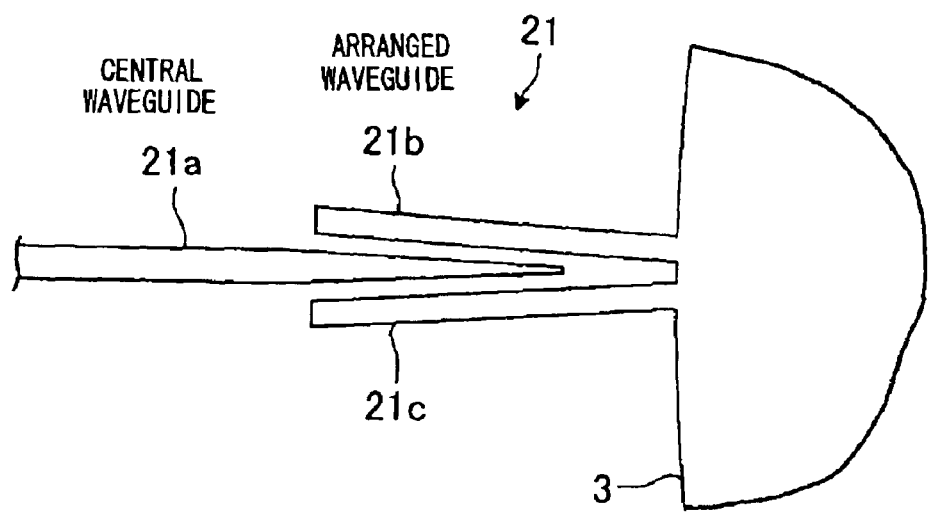

FIGS. 1(A) and 1(B) are views showing a first embodiment of a directional coupler applicable to the present invention. FIG. 1(A) is a view showing positions where a directional coupler and the surrounding elements connect. FIG. 1(B) is an enlarged view of portion A shown in FIG. 1(A). Hereinafter, for the sake of simplicity it is assumed that the optical input waveguide 2 includes only one waveguide.

As shown in FIG. 1(A), a directional coupler 21 is located between the optical input waveguide 2 and sector slab waveguide 3 to connect the exit of the optical input waveguide 2 and the entrance of the sector slab waveguide 3. As shown in FIG. 1(B), the directional coupler 21 has a symmetrical structure comprising a central waveguide 21a including the end portion on the sector slab waveguide 3 side of the optical input waveguide 2 and arranged waveguides 21b and 21c arranged on both sides of the central waveguide 21a.

A taper is formed on both side portions of the central waveguide 21a so that the width of a core will gradually narrow in the direction of the end portion on the sector slab waveguide 3 side. This end portion is not touching the sector slab waveguide 3. The width of a core in each of the arranged waveguides 21b and 21c is uniform. The arranged waveguides 21b and 21c are located parallel to the taper of the central waveguide 21a at a predetermined distance so that light which propagates through the central waveguide 21a will couple with the arranged waveguides 21b and 21c. The exit of each of the arranged waveguides 21b and 21c connects with the entrance of the sector slab waveguide 3.

With the directional coupler 21 having this structure, light input from the optical input waveguide 2 and propagated through the central waveguide 21a couples with the arranged waveguides 21b and 21c arranged on both sides of the central waveguide 21a and its power shifts. Light is output from each of the arranged waveguides 21b and 21c to the sector slab waveguide 3. Therefore, in the sector slab waveguide 3, the intensity of light output from the arranged waveguides 21b and 21c overlaps and two peaks will appear in the shape of a mode of light.

The signal light beams output from the directional coupler 21 in this way propagate through the sector slab waveguide 3 on the input side and the arrayed waveguide 4. Then the signal light beams corresponding to the peaks are condensed at different positions at the exit of the sector slab waveguide 5 on the output side. Therefore, two peaks also appear in the shape of a mode of light obtained at the exit of the sector slab waveguide 5.

Figure 3A:
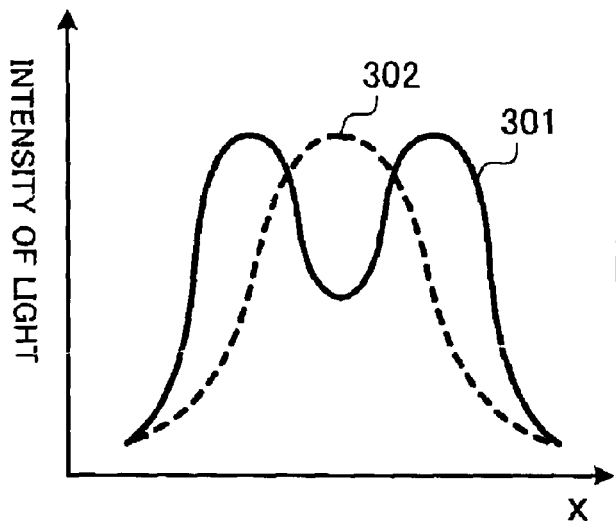
FIGS. 3(A) and 3(B) are graphs for describing flattening passband characteristics obtained in optical output waveguides according to the present invention.
Figure 3B:
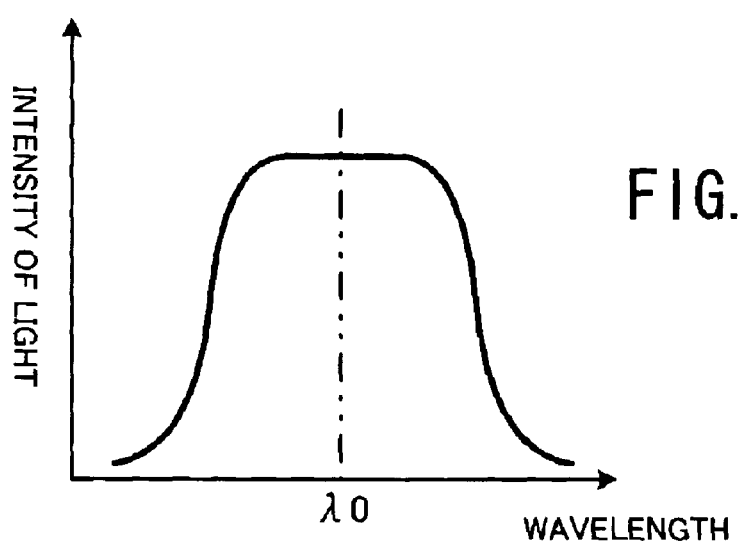

FIGS. 3(A) and 3(B) are graphs for describing flattening passband characteristics obtained in the optical output waveguides 6. The x-axis in FIG. 3(A) is perpendicular to the waveguides of the arrayed waveguide 4 or the optical output waveguide 6.

In FIG. 3(A), the shape of a mode of light output from the arrayed waveguide 4 to the sector slab waveguide 5 on the output side is shown by a curve 301, where two peaks appear. This is the same with the light output from the directional coupler 21. On the other hand, one peak appears in the shape of a mode of light in the optical output waveguides 6 as shown by a curve 302. If these two modes couple, a passband characteristic can be estimated approximately by an overlap integral of the two modes. This passband characteristic is shown in FIG. 3(B). As shown in FIG. 3(B), light of constant intensity in a used wavelength range with the center wavelength $\lambda 0$ as its center can be obtained in the optical output waveguides 6.

In the above directional coupler 21, the power of light which branches to the arranged waveguide 21b or 21c located on only one side of the central waveguide 21a changes according to its wavelengths. In the present invention, however, the arranged waveguides 21b and 21c are located symmetrically on both sides of the central waveguide 21a. Therefore, even if the power of light which branches to the arranged waveguide 21b or 21c changes, the amount of the power of light which branches to each of the arranged waveguides 21b and 21c is the same.

Figure 4:
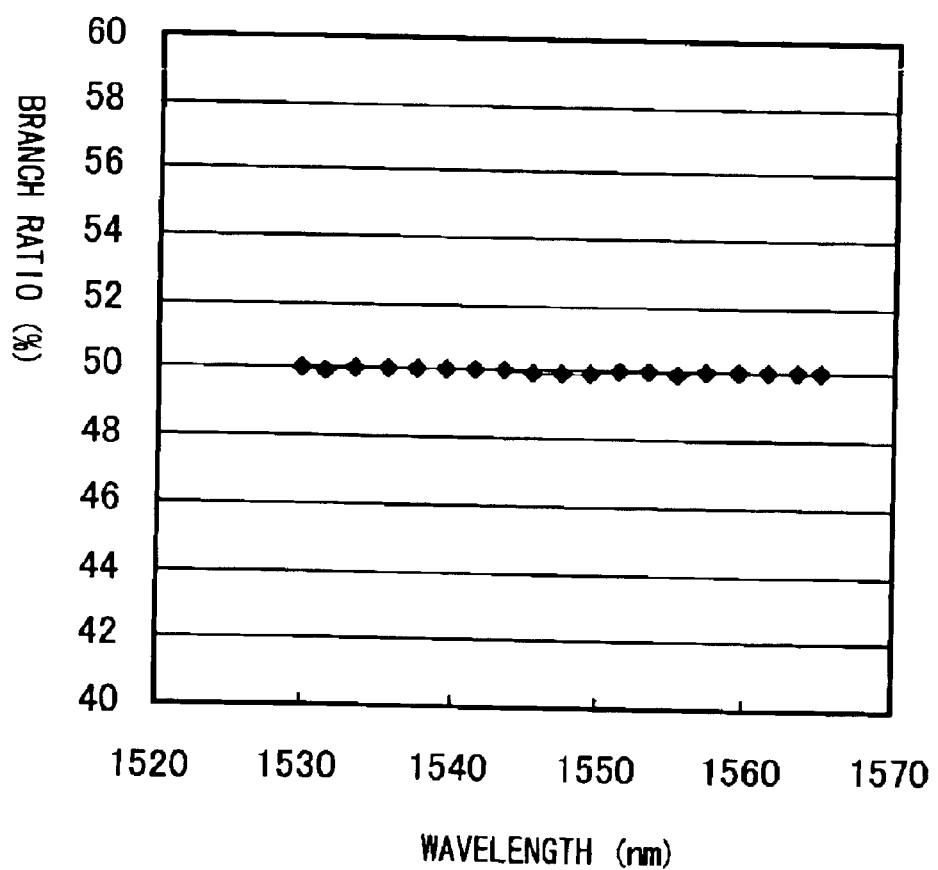
FIG. 4 is a graph showing the ratio of the power of light which branches to each arranged waveguide in a directional coupler.

FIG. 4 is a graph showing the ratio of the power of light which branches to each of the arranged waveguide 21b and 21c in the directional coupler 21.

FIG. 4 shows the result of simulating the ratio of power which branches to the arranged waveguide 21b located on one side of the central waveguide 21a to the power of light input to the directional coupler 21 in the case of the wavelength of the input light changing. Simulations were done by a beam propagation method (BPM). It is assumed that a portion where the central waveguide 21a and arranged waveguide 21b couple and a portion where the central waveguide 21a and arranged waveguide 21c couple are 900 $\mu$m in length. As shown in FIG. 4, in a wavelength range of from about 1,530 to 1,565 nm, the ratio of light which branches to the arranged waveguide 21b to light input to the directional coupler 21 is about 50%, that is to say, the amount of power of light which branches to each of the arranged waveguides 21b and 21c is always the same. Therefore, two peaks which are always equal in height will appear in the shape of a mode of light output to the sector slab waveguide 3 in spite of a difference in wavelength.

As stated above, the directional coupler 21 has a symmetrical structure. Therefore, in addition to such an advantage, the phases of light output from the arranged waveguides 21b and 21c are always the same and light output from the arranged waveguides 21b and 21c can be input to each waveguide of the arrayed waveguide 4 under the same conditions.

If structural parameters for the above directional coupler 21 are selected so that all the power of light input to the directional coupler 21 will shift from the central waveguide 21a to the arranged waveguides 21b and 21c, the values of excess loss which will occur to output light are theoretically very small regardless of the width of gaps in the coupling portion.

Figure 5:
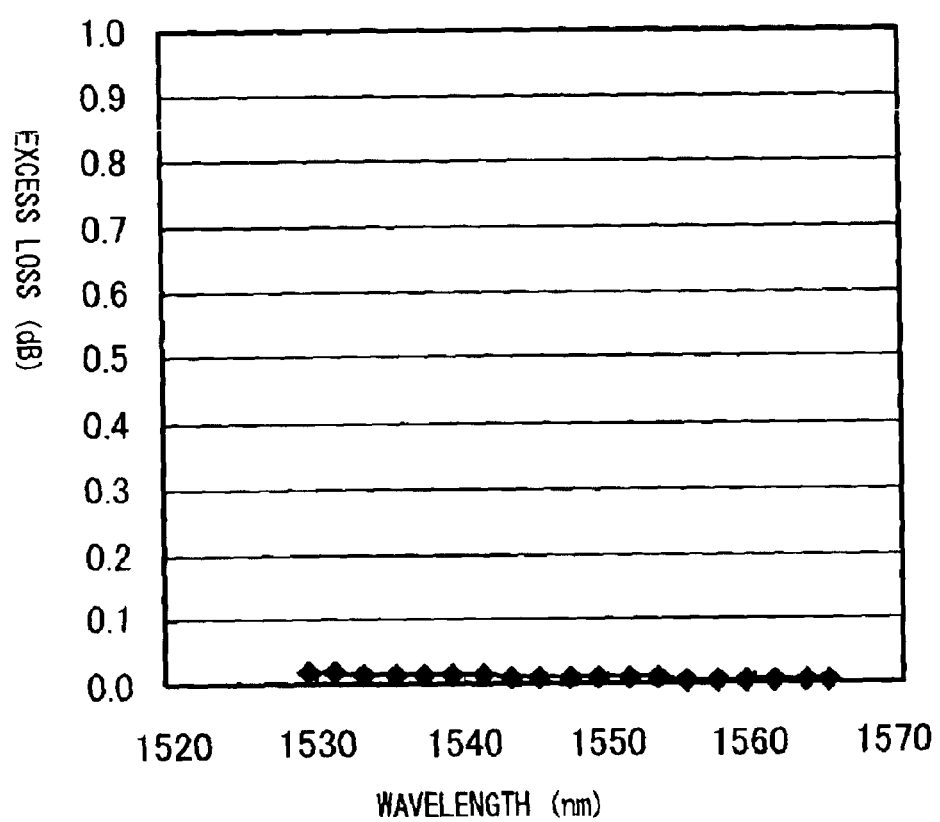
FIG. 5 is a graph showing the values of excess loss of light which occurs in a directional coupler.

FIG. 5 is a graph showing the values of excess loss of light which occur in the directional coupler 21.

FIG. 5 shows the result of simulating the values of excess loss which occurs in the directional coupler 21 in the case of the wavelength of light input to the directional coupler 21 changing. Simulations were done by the BPM. It is assumed that coupling length between the central waveguide 21a and arranged waveguides 21b and between the central waveguide 21a and arranged waveguides 21c are 900 $\mu$m. This graph shows that all the values of excess loss which occurs in a wavelength range of from about 1,530 to 1,565 nm are very small (well below 0.1 dB). That is to say, loss which occurs in the directional coupler 21 are small in spite of a difference in wavelength.

Moreover, in this embodiment, a taper is formed on both side portions of the central waveguide 21a so that the width of a core will gradually narrow in the direction of the end portion on the sector slab waveguide 3 side. The arranged waveguides 21b and 21c on the both sides of the central waveguide 21a are located so that the arranged waveguides 21b and 21c will be parallel to the taper adjacent to them. This degrades the ability of the central waveguide 21a to confine light in its core. Compared with, for example, a case where the width of the core in the central waveguide 21a is uniform, light can be coupled to the arranged waveguides 21b and 21c with coupling length shortened.

Furthermore, with the above structure, the space between the exits for the sector slab waveguide 3 of the arranged waveguides 21b and 21c can be narrowed by gradually narrowing the width of the core in the central waveguide 21a. As a result, the distance between two peaks which light radiated to the sector slab waveguide 3 has can be narrowed.

In the optical output waveguides 6 in the optical multiplexer/demultiplexer 1 using an arrayed waveguide grating, it is desirable that passband characteristics are flat in a used wavelength region and that cross talk caused by a spectrum corresponding to an adjacent wavelength does not occur. Therefore, the distance between peaks which appear in light output from the directional coupler 21 must be determined according to structural parameters for each portion. These structural parameters include an interval between wavelengths demultiplexed, the size of the slab waveguide 3 on the input side, an interval between waveguides of the arrayed waveguide 4.

With the directional coupler 21 in this embodiment, the distance between peaks which appear in light output can be adjusted by changing the angle of the taper formed on the central waveguide 21a. Passband characteristics in the optical output waveguides 6 therefore can be made flat properly.

In addition, with the above directional coupler 21, the exit of the central waveguide 21a including the end portion of the optical input waveguide 2 is not connected to the entrance of the sector slab waveguide 3. This prevents light which leaks out from the central waveguide 21a from being guided through the sector slab waveguide 3.

Now, a concrete example of a design for the optical multiplexer/demultiplexer 1 in which the directional coupler 21 having the above structure is located will be given.

In this example, a waveguide structure for an arrayed waveguide grating is formed on a silicon substrate. Material for the waveguides is silica glass. The thickness of a lower clad layer, core layer, and upper clad layer are 15, 5.4, and 15 $\mu$m respectively. The width of the core is 5.4 $\mu$m. The difference in relative index between the core layer and lower clad layer and between the core layer and upper clad layer are 0.80%. In the directional coupler 21, the space between the exit of the central waveguide 21a and the sector slab waveguide 3 is 50 $\mu$m, the width of the core at the exit of the central waveguide 21a is 4.8 $\mu$m, and coupling length between the central waveguide 21a and arranged waveguide 21b and between the central waveguide 21a and arranged waveguide 21c are 825 $\mu$m.

With the optical multiplexer/demultiplexer 1 having this structure, excess loss in the directional coupler 21 is smaller than or equal to 0.2 dB. If a conventional Y branch circuit which generates the same distance between peaks in output light as the directional coupler 21 is used and the width of a gap between waveguides in this Y branch circuit which branch is 4.0 $\mu$m, then excess loss is 0.5 dB. Therefore, by using the directional coupler 21 having the above structure, loss can be reduced by over 0.3 dB.

Figure 6:
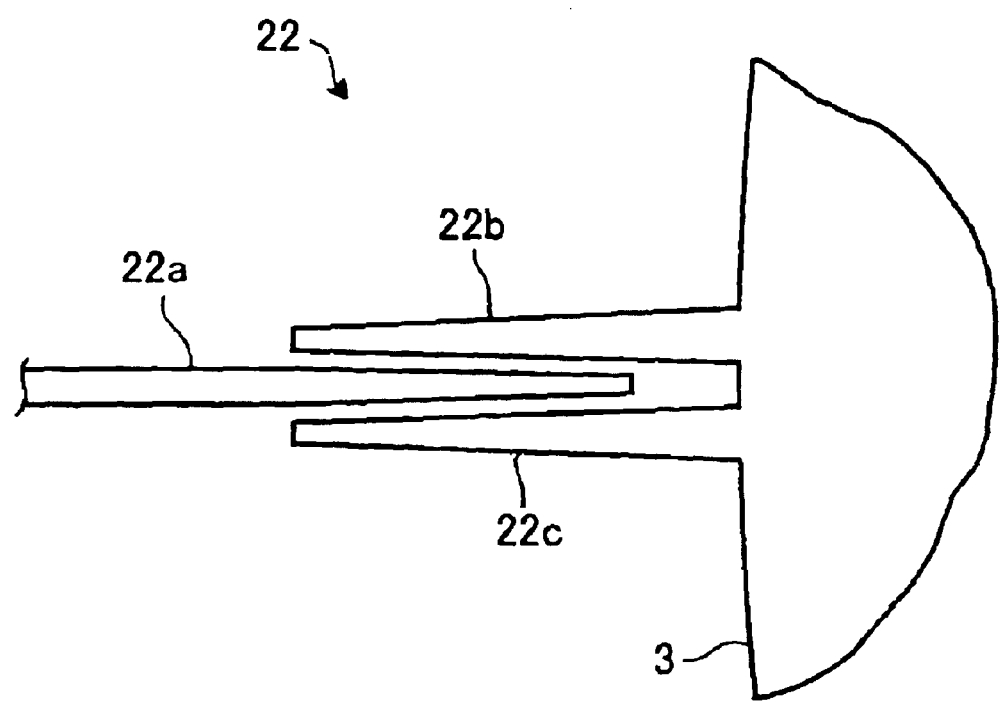
FIG. 6 is a view showing a second embodiment of a directional coupler applicable to the present invention.

A directional coupler located between the optical input waveguide 2 and sector slab waveguide 3 to reduce loss and to make a passband characteristic flat can take other shapes. FIG. 6 is a view showing a second embodiment of a directional coupler applicable to the present invention.

A directional coupler 22 shown in FIG. 6, as in the above first embodiment, has a basic structure comprising a central waveguide 22a including the exit of the optical input waveguide 2 and arranged waveguides 22b and 22c arranged on the both sides of the central waveguide 22a. A taper, as in the first embodiment, is formed on both side portions of the central waveguide 22a so that the width of a core will gradually narrow in the direction of the end portion on the sector slab waveguide 3 side. Moreover, the exit where the width of the core is narrowest is located so that it will not touch the sector slab waveguide 3.

On the other hand, a taper is formed on both side portions of each of the arranged waveguides 22b and 22c so that the width of a core will gradually widen in the direction of the sector slab waveguide 3. Furthermore, the arranged waveguides 22b and 22c are located so that light which propagated through the central waveguide 22a will couple with them. An end where coupled light is output is connected to the entrance of the sector slab waveguide 3.

With the above directional coupler 22, light input from the optical input waveguide 2 to the central waveguide 22a is coupled to the arranged waveguides 22b and 22c. As a result, two peaks of the same intensity appear in the shape of a mode of light output from each of the arranged waveguides 22b and 22c to the sector slab waveguide 3. Moreover, the width of the core in the central waveguide 22a gradually narrows in the direction of the exit, so the distance between the centers of the cores in the arranged waveguides 22b and 22c shortens and the distance between the two peaks which appear in the shape of a mode will shorten.

Two peaks appear in the shape of a mode of light output from the directional coupler 22 and passband characteristics in the optical output waveguides 6 are made flat. However, cross talk caused by an adjacent wavelength demultiplexed at this time must be prevented. In that case, it is desirable that the shape of a mode of light output from the directional coupler 22 can be controlled more flexibly. In this embodiment, the shape of a mode of output light will spread horizontally with the width of the core at the exit of each of the arranged waveguides 22b and 22c. The shape of a mode therefore can be controlled not only by adjusting the distance between two peaks but also by horizontally spreading. That is to say, the shape of a mode can be controlled finer and more proper passband characteristics can be obtained.

Now, a concrete example of a design for a directional coupler according to this embodiment will be given.

In this example, a waveguide structure for an arrayed waveguide grating is formed on a silicon substrate. This is the same with the above first embodiment. Material for the waveguides is silica glass. The thickness of a lower clad layer, core layer, and upper clad layer are 15, 5.4, and 15 $\mu$m respectively. The width of the core is 5.4 $\mu$m. The difference in relative index between the core layer and lower clad layer and between the core layer and upper clad layer are 0.80%. In the directional coupler 22, the space between the exit of the central waveguide 22a and the sector slab waveguide 3 is 50 $\mu$m, the width of the core at the exit of the central waveguide 22a is 4.0 μm, and coupling length between the central waveguide 22a and arranged waveguide 22b and between the central waveguide 22a and arranged waveguide 22c are 1890 μm. The width of the core in each of the arranged waveguides 22b and 22c is 4.0 μm at the narrowest portion and 6.0 μm at the exit, being the widest portion.

With this structure, excess loss in the directional coupler 22 is smaller than or equal to 0.2 dB. If a conventional Y branch circuit which generates the same distance between peaks in output light as the directional coupler 22 is used and the width of a gap between waveguides in this Y branch circuit which branch is 4.0 μm, then excess loss is 0.5 dB. Therefore, by using the directional coupler 22 having the above structure, loss can be reduced by over 0.3 dB.

Figure 7:
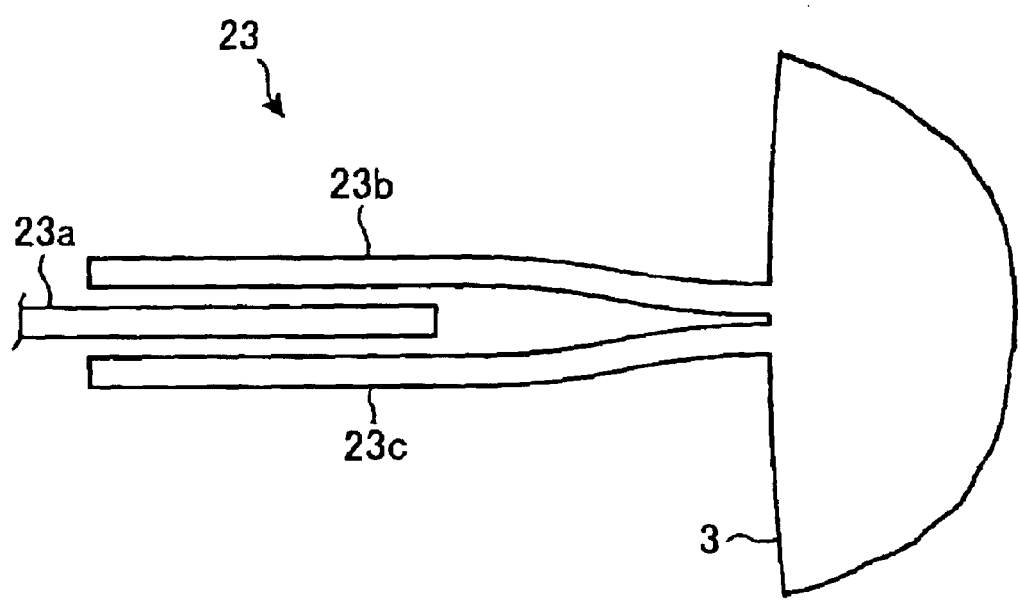
FIG. 7 is a view showing a third embodiment of a directional coupler applicable to the present invention.

By the way, if the width of a core in a central waveguide in a directional coupler is uniform, loss can be reduced and passband characteristics can be made flat as in the above embodiments. Now, such embodiments will be described. FIG. 7 is a view showing a third embodiment of a directional coupler applicable to the present invention.

A directional coupler 23 shown in FIG. 7, as in the above first and second embodiments, has a basic structure comprising a central waveguide 23a including the exit of the optical input waveguide 2 and arranged waveguides 23b and 23c arranged on the both sides of the central waveguide 23a. The width of a core in the central waveguide 23a is uniform. Moreover, the exit of the central waveguide 23a is located so that it will not touch the sector slab waveguide 3.

The width of a core in each of the arranged waveguides 23b and 23c is uniform. The end portions on the optical input waveguide 2 side of the arranged waveguides 23b and 23c are arranged on both sides of the central waveguide 23a to form an optical coupling portion. Each of the arranged waveguides 23b and 23c is gently curved from the exit of the central waveguide 23a to the end portion on the sector slab waveguide 3 side. The space between the arranged waveguides 23b and 23c gradually narrows in the direction of their end portions and they are connected to the entrance of the sector slab waveguide 3.

With the above directional coupler 23, light input from the optical input waveguide 2 to the central waveguide 23a is coupled to portions of the arranged waveguides 23b and 23c where they are arranged on both sides of the central waveguide 23a. As a result, two peaks of the same intensity appear in the shape of a mode of light output from the arranged waveguides 23b and 23c to the sector slab waveguide 3. Moreover, the central waveguide 23a is located so that a wide space will be left between the exit of the central waveguide 23a and the sector slab waveguide 3. Therefore, the distance between the arranged waveguides 23b and 23c can be narrowed between the exit of the central waveguide 23a and the sector slab waveguide 3. As a result, the distance between the centers of the cores in the arranged waveguides 23b and 23c shortens and the distance between the two peaks which appear in the shape of a mode will shorten.

Now, a concrete example of a design for a directional coupler according to this embodiment will be given.

In this example, a waveguide structure for an arrayed waveguide grating is formed on a silicon substrate. This is the same with the above first and second embodiments. Material for the waveguides is silica glass. The thickness of a lower clad layer, core layer, and upper clad layer are 15, 5.4, and 15 μm respectively. The width of the core is 5.4 μm. The difference in relative index between the core layer and lower clad layer and between the core layer and upper clad layer are 0.80%.

In the directional coupler 23, coupling length between the central waveguide 23a and arranged waveguide 23b and between the central waveguide 23a and arranged waveguide 23c are 900 μm. Each of the arranged waveguides 23b and 23c initially curves to the gap side from the exit of the central waveguide 23a at a constant curvature and afterwards curves to the opposite side at the same curvature. The axes of the cores in the arranged waveguides 23b and 23c are parallel to each other at the entrance of the sector slab waveguide 3. The radius of the curvature of the arranged waveguides 23b and 23c is 8,000 μm. The distance between the centers of the cores in the arranged waveguides 23b and 23c is 16.4 μm at the portion where the arranged waveguides 23b and 23c couple with the central waveguide 23a, and is 9.4 μm at an interface between the arranged waveguides 23b and 23c and the sector slab waveguide 3.

With this structure, excess loss in the directional coupler 23 is 0.2 dB. If a conventional Y branch circuit which generates the same distance between peaks in output light as the directional coupler 23 is used and the width of a gap between waveguides in this Y branch circuit which branch is 4.0 μm, then excess loss is 0.5 dB. Therefore, by using the directional coupler 23 having the above structure, loss can be reduced by 0.3 dB.

In the above third embodiment, the space between the exit of the central waveguide 23a and the sector slab waveguide 3 is wide. Therefore, the distance between the arranged waveguides 23b and 23c can be narrowed at their exits regardless of the width of the core in the central waveguide 23a. As a result, the distance between two peaks which appear in the shape of a mode of output light can be shortened and proper passband characteristics can be obtained in the optical output waveguides 6.

By widening the space between the exit of the central waveguide 23a and the sector slab waveguide 3 in this way, the distance between the arranged waveguides 23b and 23c at the interface between the arranged waveguides 23b and 23c and the sector slab waveguide 3 can be designed freely. Therefore, the distance between two peaks which appear in the shape of a mode of light output from the directional coupler 23 can be adjusted according to passband characteristics needed. For example, to increase the distance between two peaks which appear in the shape of a mode of output light, the structure of the following fourth embodiment should be adopted.

Figure 8:
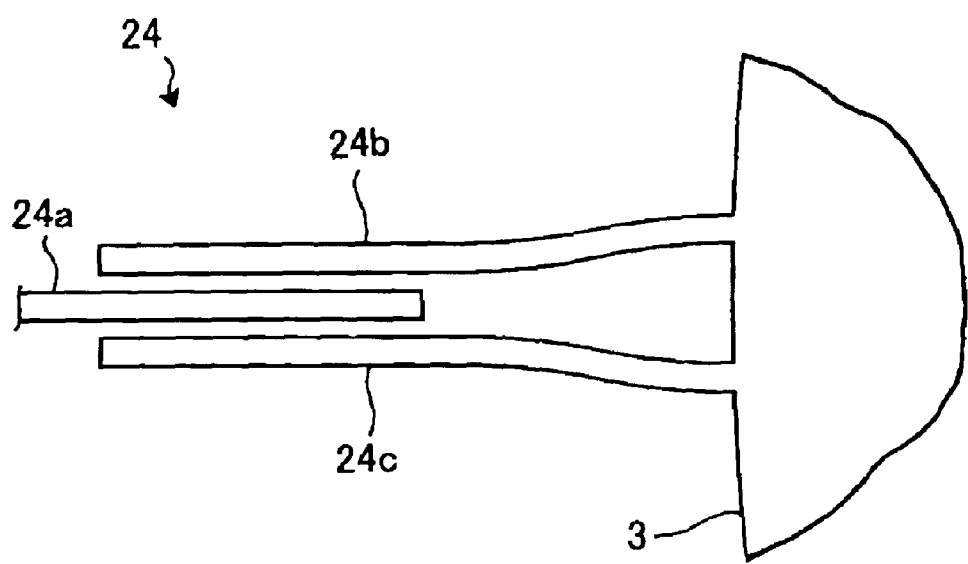
FIG. 8 is a view showing a fourth embodiment of a directional coupler applicable to the present invention.

FIG. 8 is a view showing a fourth embodiment of a directional coupler applicable to the present invention.

The structure of a directional coupler 24 shown in FIG. 8 differs from that of the above third embodiment in that the distance between the arranged waveguides 24b and 24c gradually widens in the direction of the exit of the central waveguide 24a to the sector slab waveguide 3. With this structure, excess loss which occurs in the directional coupler 24 is the same with the above third embodiment. That is to say, compared with conventional Y branch circuits, excess loss can be reduced.

With the directional couplers in the above first, second, third, and fourth embodiments, one arranged waveguide is located on each side of a central waveguide. However, more arranged waveguides may be located. In that case, the same number of arranged waveguides must be located on each side of a central waveguide. In such directional couplers, the energy of light which propagated through a central waveguide is distributed to adjacent arranged waveguides in turn. In the sector slab waveguide 3, two peaks appear in the shape of a mode of light output from each arranged waveguide. This is the same with cases where one arranged waveguide is located on each side of a central waveguide. If the same number of arranged waveguides are located on each side of a central waveguide, then the intensity of the two peaks becomes equal. Moreover, compared with cases where one arranged waveguide is located on each side of a central waveguide, the shape of a mode will spread horizontally.

By the way, in an optical multiplexer/demultiplexer using an arrayed waveguide grating, great connection loss will occur when light which propagated through the sector slab waveguide 3 on the input side enters each waveguide of the arrayed waveguide 4. This connection loss occurs regardless of whether the directional coupler according to each of the above embodiments is located between the optical input waveguide 2 and the sector slab waveguide 3. In the present invention, the exit of the sector slab waveguide 3 and the entrance of each waveguide of the arrayed waveguide 4 are connected by the use of a directional coupler to reduce this connection loss.

Figure 9A:
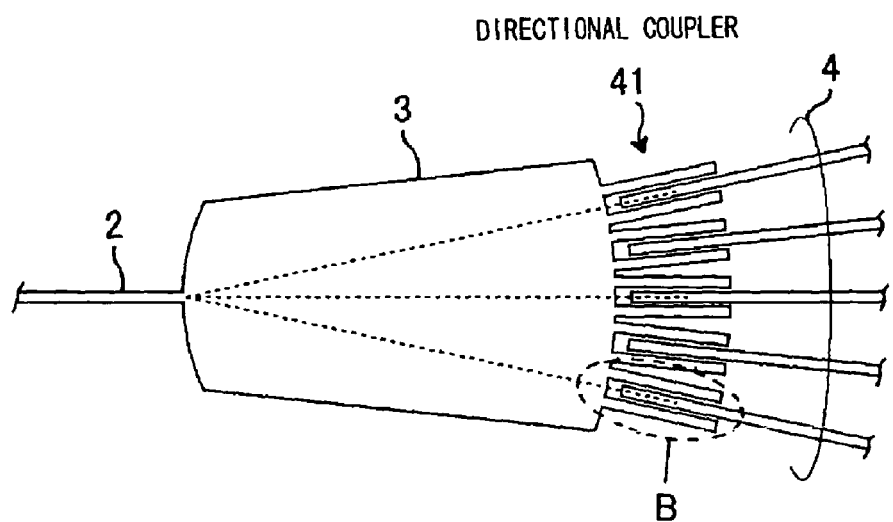
FIGS. 9(A) and 9(B) are views showing a fifth embodiment of a directional coupler applicable to the present invention, FIG. 9(A) showing positions where a directional coupler and the surrounding elements connect, FIG. 9(B) being an enlarged view of portion B shown in FIG. 9(A).
Figure 9B:
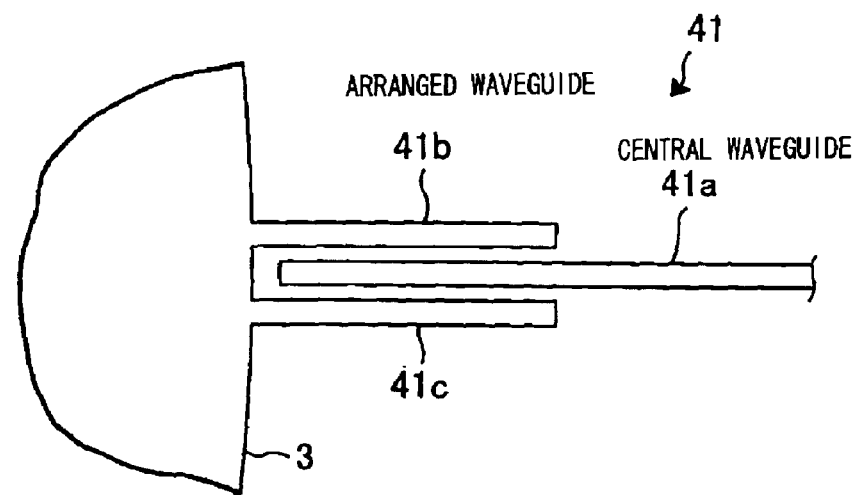

FIGS. 9(A) and 9(B) are views showing a fifth embodiment of a directional coupler applicable to the present invention. FIG. 9(A) is a view showing positions where a directional coupler and the surrounding elements connect. FIG. 9(B) is an enlarged view of portion B in FIG. 9(A). Hereinafter, for the sake of simplicity, it is assumed that the optical input waveguide 2 includes only one waveguide and that the arrayed waveguide 4 includes five waveguides.

As shown in FIG. 9(A), a directional coupler 41 is located between the sector slab waveguide 3 and each waveguide of the arrayed waveguide 4 to connect the exit of the sector slab waveguide 3 and the entrance of each waveguide of the arrayed waveguide 4. As shown in FIG. 9(B), the directional coupler 41 has a symmetrical structure comprising a central waveguide 41a including the end portion on the sector slab waveguide 3 side of each waveguide of the arrayed waveguide 4 and arranged waveguides 41b and 41c arranged on both sides of the central waveguide 41a.

The width of a core in the central waveguide 41a is uniform. The central waveguide 41a is located so that there will be a predetermined space between its entrance and the exit of the sector slab waveguide 3. The arranged waveguides 41b and 41c are of the same length and cores in them are uniform in width. The arranged waveguides 41b and 41c are located so that their entrances will connect with the exit of the sector slab waveguide 3 and so that light input from the sector slab waveguide 3 will couple with the central waveguide 41a.

In the directional coupler 41 having the above structure, light is output from the optical input waveguide 2, propagates through the sector slab waveguide 3, is input to the arranged waveguides 41b and 41c, couples with the central waveguide 41a, and propagates through each waveguide of the arrayed waveguide 4. Loss which occurs in optical coupling between the arranged waveguide 41b and the central waveguide 41a and between the arranged waveguide 41c and the central waveguide 41a is very small. Furthermore, the entrance of the central waveguide 41a is not connected to the exit of the sector slab waveguide 3. This prevents light which leaks out from the sector slab waveguide 3 from being guided through the central waveguide 41a.

Moreover, the two arranged waveguides 41b and 41c are connected to each waveguide of the arrayed waveguide 4 at the exit of the sector slab waveguide 3. Therefore, compared with cases where each waveguide of the arrayed waveguide 4 is connected directly to the sector slab waveguide 3, the number of waveguides connected doubles.

Figure 10A:
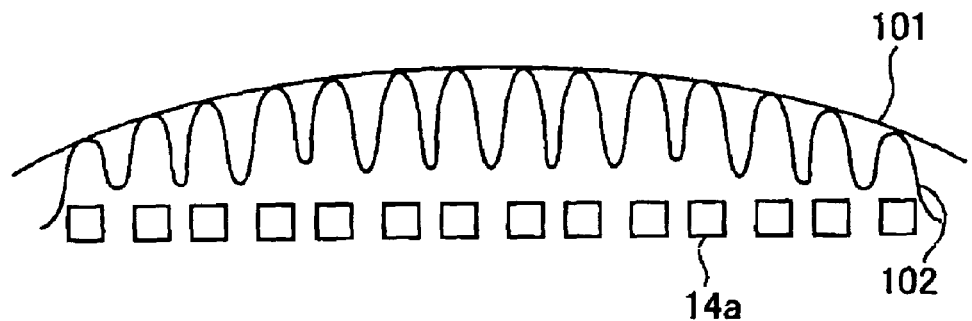
FIGS. 10(A) and 10(B) are schematic views showing the shape of a mode at the exit of a sector slab waveguide in contradistinction to the arrangement of cores in waveguides connected to the sector slab waveguide, FIG. 10(A) showing a case where a directional coupler according to the fifth embodiment is located, FIG. 10(B) showing a conventional structure in which an arrayed waveguide is connected directly to the sector slab waveguide.
Figure 10B:
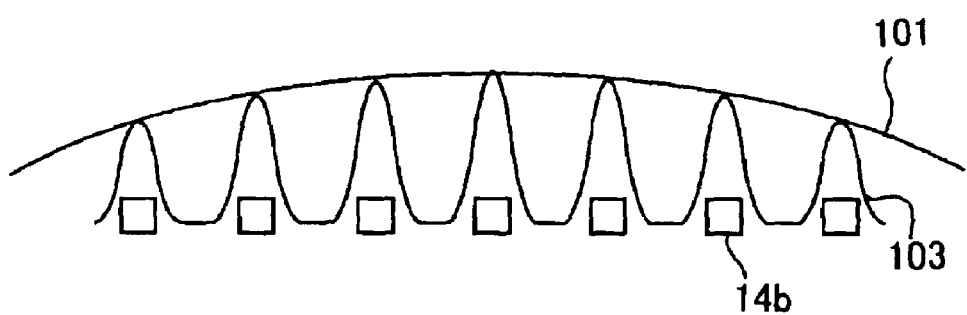

FIGS. 10(A) and 10(B) are schematic views showing the shape of a mode at the exit of the sector slab waveguide 3 in contradistinction to the arrangement of cores in waveguides connected to the sector slab waveguide 3. FIG. 10(A) shows a case where the directional coupler 41 according to the fifth embodiment is located. FIG. 10(B) shows a conventional structure in which each waveguide of the arrayed waveguide 4 is connected directly to the sector slab waveguide 3.

As shown by a curve 101 in FIG. 10(A), the shape of a mode of light radiated from the exit of the sector slab waveguide 3 spreads significantly and horizontally at an interface between the sector slab waveguide 3 and the arranged waveguides 41b and 41c in the directional coupler 41. Furthermore, the shape of a mode of each of the arranged waveguides 41b and 41c is narrow in its width according to the width of a core 14a. Therefore, as shown by a curve 102, the shape of a mode as a whole obtained on the arranged waveguide side will be given by synthesizing the shape of these modes.

With a conventional structure in which each waveguide of the arrayed waveguide 4 is connected directly to the sector slab waveguide 3, the shape of a mode as a whole obtained on the arrayed waveguide 4 side will be given by a curve 103 in FIG. 10(B). FIGS. 10(A) and 10(B) show that the curve 102 is more similar to the shape of a mode in the sector slab waveguide 3 than the curve 103. The reason for this is as follows. It is assumed that the width of the core 14a is the same as that of a core 14b. In a case where the directional coupler 41 according to the fifth embodiment is located, a larger number of waveguides are connected to the sector slab waveguide 3 and the space between the cores 14a narrows. By making the shape of a mode of each waveguide connected similar to the shape of a mode of light at the exit of the sector slab waveguide 3 in this way, a mode mismatch state will be improved. As a result, connection loss can be reduced significantly.

Figure 11:
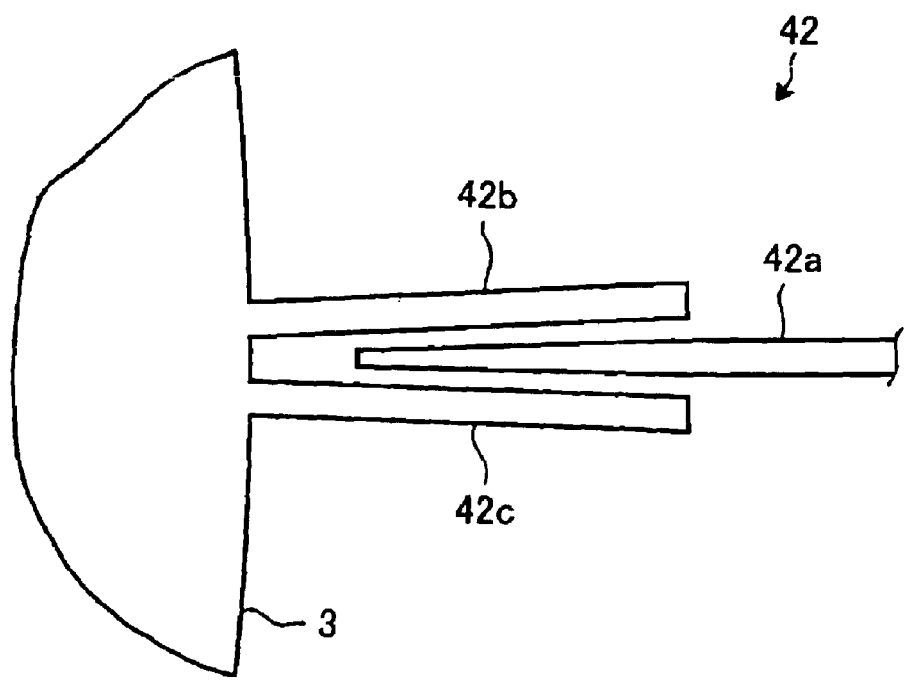
FIG. 11 is a view showing a sixth embodiment of a directional coupler applicable to the present invention.

Now, other embodiments of a directional coupler located between the sector slab waveguide 3 and each waveguide of the arrayed waveguide 4 will be described. FIG. 11 is a view showing a sixth embodiment of a directional coupler applicable to the present invention.

A directional coupler 42 shown in FIG. 11 has the same basic structure as that of the above fifth embodiment. That is to say, the directional coupler 42 has a symmetrical structure comprising a central waveguide 42a including the end portion on the sector slab waveguide 3 side of each waveguide of the arrayed waveguide 4 and arranged waveguides 42b and 42c which are arranged on both sides of the central waveguide 42a and the entrances of which are connected to the sector slab waveguide 3. Moreover, as in the fifth embodiment, there is space between the entrance of the central waveguide 42a and the sector slab waveguide 3.

A taper is formed on both side portions of the central waveguide 42a in the directional coupler 42 so that the width of a core in the central waveguide 42a will gradually narrow in the direction of the end portion on the sector slab waveguide 3 side. A core in each of the arranged waveguides 42b and 42c is uniform in width and the arranged waveguides 42b and 42c are arranged so that they will be parallel to the taper formed on the central waveguide 42a.

With the directional coupler 42 having the above structure, loss which occurs in optical coupling between the arranged waveguide 42b and the central waveguide 42a and between the arranged waveguide 42c and the central waveguide 42a is very small. Furthermore, the number of waveguides connected to the sector slab waveguide 3 increases, so connection loss which occurs at a portion where the directional coupler 42 and sector slab waveguide 3 connect is reduced. These are the same with the above fifth embodiment.

In addition, a taper is formed on both side portions of the central waveguide 42a, so compared with the above fifth embodiment length needed to couple light from the arranged waveguides 42b and 42c to the central waveguide 42a can be shortened.

Moreover, the width of the core in the central waveguide 42a gradually narrows in the direction of the sector slab waveguide 3, so the space between the arranged waveguides 42b and 42c at the portions where they connect with the sector slab waveguide 3 can be narrowed. As a result, a larger number of the directional couplers 42 can be connected at an interface with the sector slab waveguide 3. This will be effective in the case of waveguide density in the arrayed waveguide 4 being high.

Figure 12:
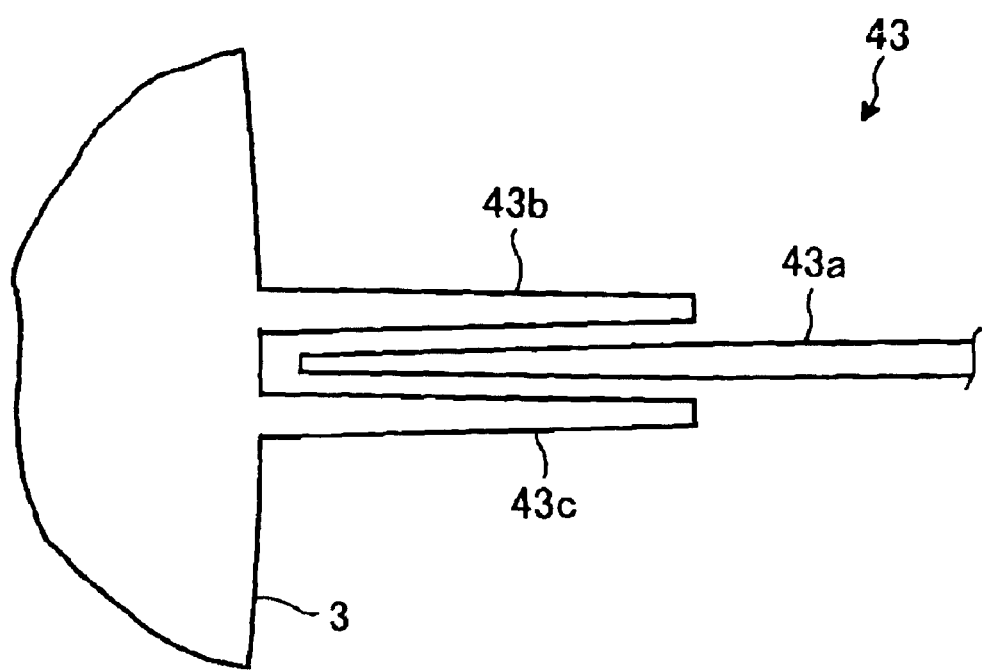
FIG. 12 is a view showing a seventh embodiment of a directional coupler applicable to the present invention.

FIG. 12 is a view showing a seventh embodiment of a directional coupler applicable to the present invention.

A directional coupler 43 shown in FIG. 12, as in the above sixth embodiment, has a symmetrical structure comprising a central waveguide 43a including the end portion on the sector slab waveguide 3 side of each waveguide of the arrayed waveguide 4 and arranged waveguides 43b and 43c which are arranged on both sides of the central waveguide 43a and the entrances of which are connected to the sector slab waveguide 3. As in the above sixth embodiment, there is space between the entrance of the central waveguide 43a and the sector slab waveguide 3. Moreover, a taper is formed on both side portions of the central waveguide 43a so that the width of a core in the central waveguide 43a will gradually narrow in the direction of the end portion on the sector slab waveguide 3 side.

A taper is also formed on both side portions of each of the arranged waveguides 43b and 43c so that the width of a core will gradually narrow in the direction of the end which connects with the sector slab waveguide 3 to the exit. The arranged waveguides 43b and 43c are located so that input light will couple with the central waveguide 43a.

With the directional coupler 43 having the above structure, a taper is formed on each of the central waveguide 43a and arranged waveguides 43b and 43c, so the space between the arranged waveguides 43b and 43c at the ends which connect with the sector slab waveguide 3 can be narrowed. This is the same with the above sixth embodiment.

Furthermore, the width of the cores in the arranged waveguides 43b and 43c is wide at an interface between the sector slab waveguide 3 and the arranged waveguides 43b and 43c, so the shape of a mode of each of the arranged waveguides 43b and 43c spreads significantly and horizontally. Therefore, the shape of a mode as a whole obtained on the arrayed waveguide 4 side becomes more similar to that of a mode of the sector slab waveguide 3 and connection loss can be reduced further.

Figure 13:
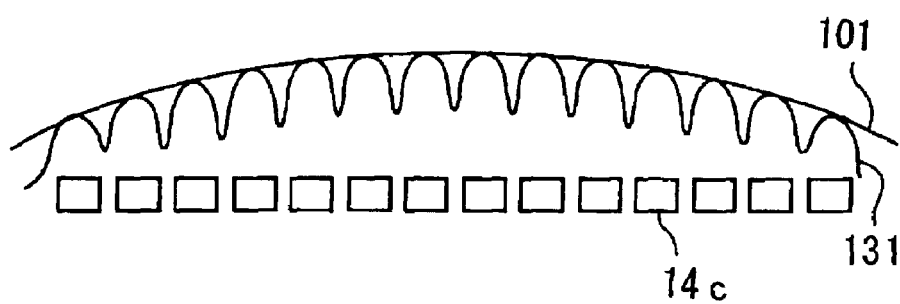
FIG. 13 is a schematic view showing the shape of a mode in the case of the width of cores in waveguides connected to a sector slab waveguide being wide.

FIG. 13 is a schematic view showing the shape of a mode in the case of the width of cores in waveguides connected to the sector slab waveguide 3 being wide.

A curve 101 in FIG. 13 shows the shape of a mode of light at the edge of the sector slab waveguide 3 where the arranged waveguides 43b and 43c are connected. In FIG. 13, the shape of a mode is shown in contradistinction to the arrangement of cores 14c in waveguides connected to the sector slab waveguide 3.

In FIG. 13, the width of each core 14c is wider than that of the core 14a shown in FIG. 10(A), so compared with FIG. 10(A) the shape of a mode of each waveguide connected to the sector slab waveguide 3 spreads. Therefore, the shape of a mode of all the waveguides is given by a curve 131. As shown by the curve 131, the intensity of light increases at positions where the shape of modes corresponding to adjacent cores 14c overlap, and the shape of a mode as a whole is more similar to that of a mode in the sector slab waveguide 3. As a result, a modem is match state between the sector slab waveguide 3 and the waveguides connected thereto is improved and connection loss is reduced further.

Figure 14:
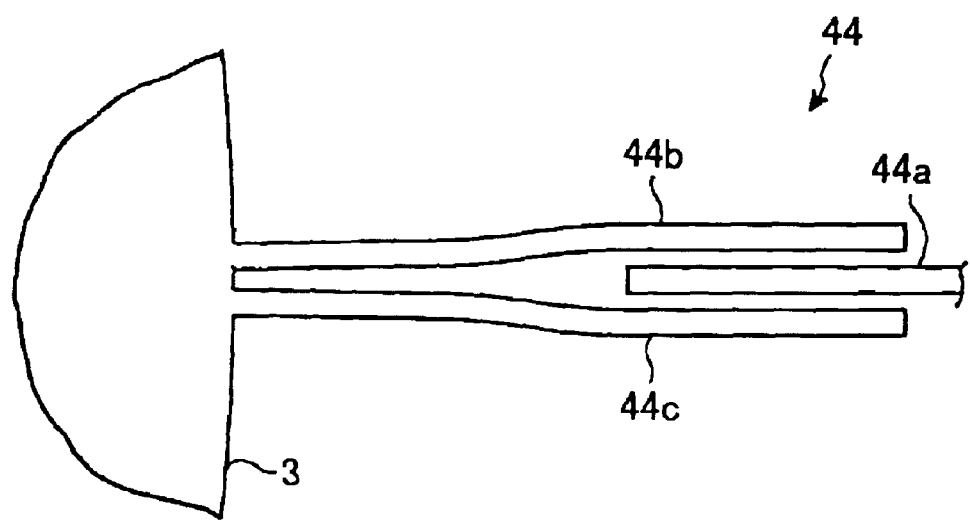
FIG. 14 is a view showing an eighth embodiment of a directional coupler applicable to the present invention.

FIG. 14 is a view showing an eighth embodiment of a directional coupler applicable to the present invention.

As in the above fifth, sixth, and seventh embodiments, a directional coupler 44 shown in FIG. 14 has a symmetrical structure comprising a central waveguide 44a including the end portion on the sector slab waveguide 3 side of each waveguide of the arrayed waveguide 4 and arranged waveguides 44b and 44c which are arranged on both sides of the central waveguide 44a and the entrances of which are connected to the sector slab waveguide 3.

In the directional coupler 44, a core in the central waveguide 44a is uniform in width and the entrance of the central waveguide 44a is located far from the exit of the sector slab waveguide 3. A core in each of the arranged waveguides 44b and 44c is uniform in width and the end portions on the arrayed waveguide 4 side of the arranged waveguides 44b and 44c are arranged on both sides of the central waveguide 44a to form an optical coupling portion. Each of the arranged waveguides 44b and 44c is gently curved from the entrance of the central waveguide 44a to the end portion on the sector slab waveguide 3 side. The space between the arranged waveguides 44b and 44c gradually narrows in the direction of their end portions and they are connected to the exit of the sector slab waveguide 3.

Figure 15:
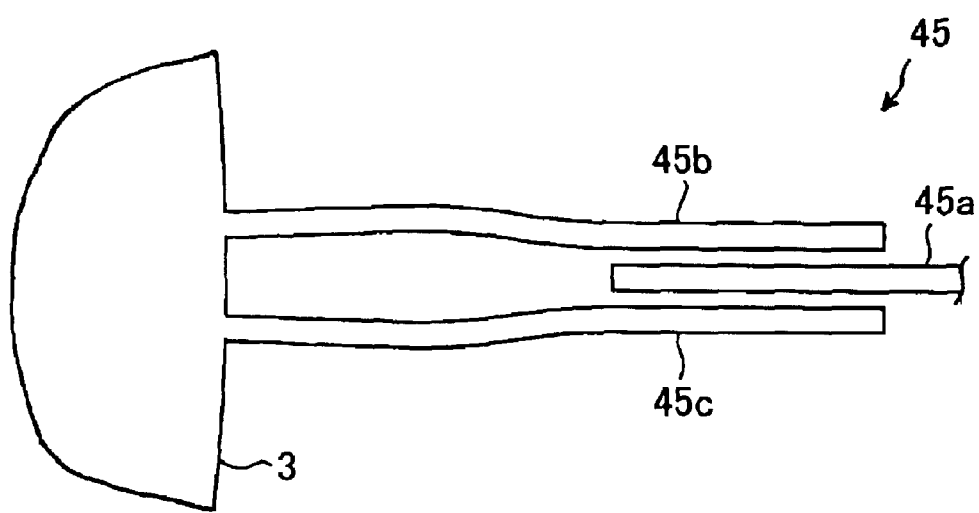
FIG. 15 is a view showing a ninth embodiment of a directional coupler applicable to the present invention.

In the eighth embodiment, the space between the arranged waveguides 44b and 44c is narrow at their ends which connect with the sector slab waveguide 3. In contrast, a structure in which the space between the arranged waveguides 44b and 44c gradually widens is also possible. Examples of a directional coupler having this structure will now be given. FIG. 15 is a view showing a ninth embodiment of a directional coupler applicable to the present invention.

The structure of a directional coupler 45 shown in FIG. 15 differs from that of the eighth embodiment shown in FIG. 14 in that the space between gently curved arranged waveguides 45b and 45c gradually widens in the direction of their end portions on the sector slab waveguide 3 side.

In the above eighth embodiment, by locating the central waveguide 44a far from the exit of the sector slab waveguide 3 and arranging the arranged waveguides 44b and 44c which are curved from the entrance of the central waveguide 44a to the sector slab waveguide 3, the space between the arranged waveguides 44b and 44c connected to the sector slab waveguide 3 can be adjusted freely at an interface between the sector slab waveguide 3 and the arranged waveguides 44b and 44c. This is the same with the ninth embodiment.

As shown in the eighth embodiment in FIG. 14, for example, the space between the arranged waveguides 44b and 44c should be narrowed at an interface between the sector slab waveguide 3 and the arranged waveguides 44b and 44c in the case of waveguide density in the arrayed waveguide 4 being high. To make the shape of a mode as a whole obtained on the arrayed waveguide 4 side more similar to that of a mode in the sector slab waveguide 3, it is desirable that cores in waveguides connected to the sector slab waveguide 3 are arranged at equal spaces. Therefore, with the structure in the eighth or ninth embodiment, the space between waveguides connected to the sector slab waveguide 3 can be adjusted optimally to reduce connection loss as much as possible.

Now, an example of a design for a directional coupler according to the eighth embodiment will be given.

In this example, a waveguide structure for an arrayed waveguide grating is formed on a silicon substrate. Material for the waveguides is silica glass. The thickness of a lower clad layer, core layer, and upper clad layer are 15, 5.4, and 15 μm respectively. The width of the core is 5.4 μm. The difference in relative index between the core layer and lower clad layer and between the core layer and upper clad layer are 0.80%.

In the directional coupler 44, coupling length between the central waveguide 44a and arranged waveguide 44b and between the central waveguide 44a and arranged waveguide 44c are 900 μm. Each of the arranged waveguides 44b and 44c initially curves to the gap side from the entrance of the central waveguide 44a at a constant curvature and afterwards curves to the opposite side at the same curvature. The arranged waveguides 44b and 44c curve so that both of the axes of the cores in the arranged waveguides 44b and 44c will extend radially from the center of curvature of the sector slab waveguide 3 at their ends which connect with the sector slab waveguide 3. The radius of the curvature of each of the arranged waveguides 44b and 44c is 8,000 μm. The distance between the centers of the cores in the arranged waveguides 44b and 44c is 16.4 μm at the portion where the arranged waveguides 44b and 44c couple with the central waveguide 44a, and is 10 μm at an interface between the arranged waveguides 44b and 44c and the sector slab waveguide 3.

Compared with cases where each waveguide (the width of a core is 5.4 μm) of the arrayed waveguide 4 is connected directly to the sector slab waveguide 3, connection loss which occurs at a portion where the directional coupler 44 and sector slab waveguide 3 connect is reduced by 3.2 dB by adopting the above structure.

As described in FIG. 13, the shape of a mode as a whole obtained on the arrayed waveguide 4 side becomes more similar to that of a mode in the sector slab waveguide 3 with the width of cores in waveguides connected to the sector slab waveguide 3, so connection loss is reduced. With the structure in the eighth embodiment shown in FIG. 14 or in the ninth embodiment shown in FIG. 15, loss can also be reduced further by widening the width of the cores at the ends of the directional coupler where the directional coupler and sector slab waveguide 3 connect.

Figure 16:
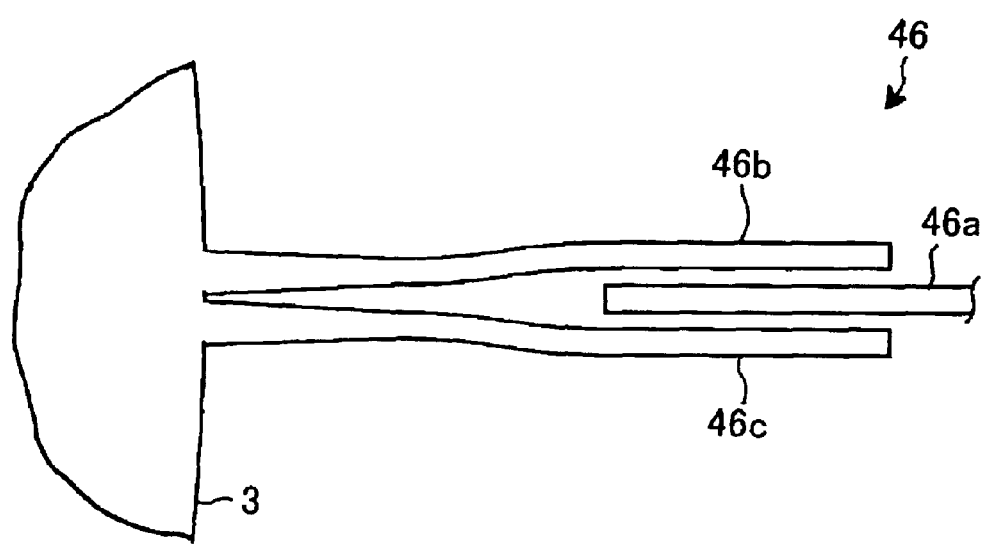
FIG. 16 is a view showing a tenth embodiment of a directional coupler applicable to the present invention.
Figure 17:
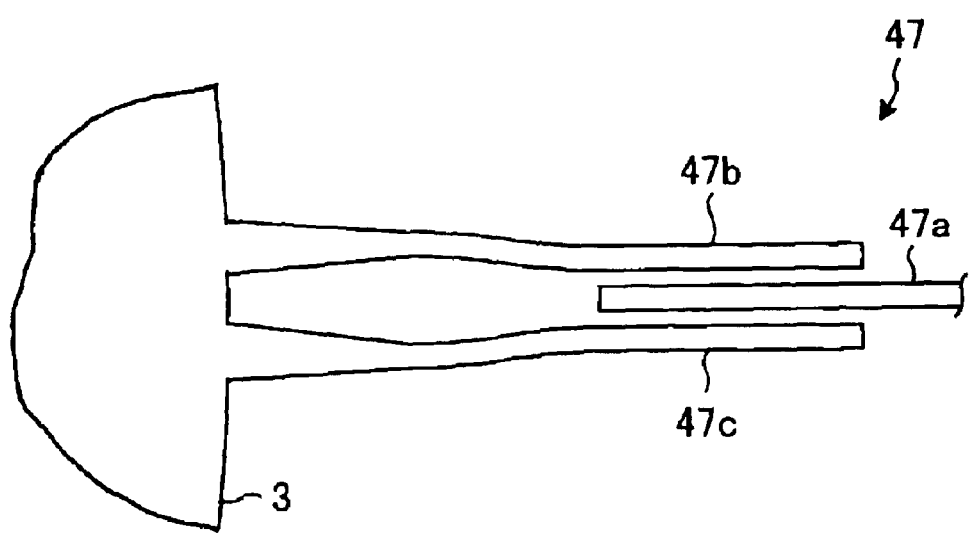
FIG. 17 is a view showing an eleventh embodiment of a directional coupler applicable to the present invention.

Such embodiments will now be described. FIG. 16 is a view showing a tenth embodiment of a directional coupler applicable to the present invention. FIG. 17 is a view showing an eleventh embodiment of a directional coupler applicable to the present invention.

A directional coupler 46 shown in FIG. 16 comprises a central waveguide 46a and arranged waveguides 46b and 46c arranged on both sides of the central waveguide 46a. The width of a core in each waveguide is uniform at a portion where the arranged waveguides 46b and 46c couple with the central waveguide 46a. Each of the arranged waveguides 46b and 46c is curved from the entrance of the central waveguide 46a to the end portion on the sector slab waveguide 3 side. The distance between the centers of the cores in the arranged waveguides 46b and 46c gradually narrows. These are the same with the eighth embodiment shown in FIG. 14. The structure of the directional coupler 46 shown in FIG. 16 differs from that of the eighth embodiment in that a taper is formed on both side portions of each of the arranged waveguides 46b and 46c so that the width of the core will gradually widen in the direction of the end which connects with the sector slab waveguide 3.

On the other hand, a directional coupler 47 shown in FIG. 17 comprises a central waveguide 47a and arranged waveguides 47b and 47c arranged on both sides of the central waveguide 47a. The width of a core in each waveguide is uniform at a portion where the arranged waveguides 47b and 47c couple with the central waveguide 47a. Each of the arranged waveguides 47b and 47c is curved from the entrance of the central waveguide 47a to the end on the sector slab waveguide 3 side. The distance between the centers of the cores in the arranged waveguides 47b and 47c gradually narrows. These are the same with the ninth embodiment shown in FIG. 15. The structure of the directional coupler 47 shown in FIG. 17 differs from that of the ninth embodiment in that a taper is formed on both side portions of each of the arranged waveguides 47b and 47c so that the width of the core will gradually widen in the direction of the end which connects with the sector slab waveguide 3.

In the directional coupler 46, the space between the central waveguide 46a and the sector slab waveguide 3 is wide and a portion on the sector slab waveguide 3 side of each of the arranged waveguides 46b and 46c is curved. As a result, the space between the waveguides connected to the sector slab waveguide 3 can be adjusted freely. In addition, the width of the core in each waveguide widens at the end which connects with the sector slab waveguide 3. This reduces connection loss. The same applies to the directional coupler 47.

In the above tenth and eleventh embodiments, the width of the core in each of the waveguides connected to the sector slab waveguide 3 is widened. By contrast, the shape of a mode in each of these waveguides may spread in the case of the width of the core being extremely narrow. In that case, connection loss can be reduced also. Embodiments having this structure will now be described.

Figure 18:
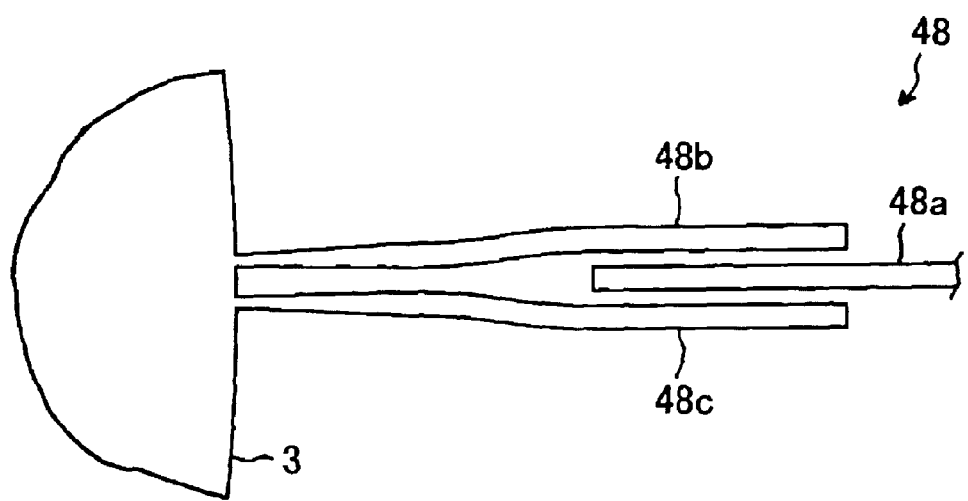
FIG. 18 is a view showing a twelfth embodiment of a directional coupler applicable to the present invention.
Figure 19:
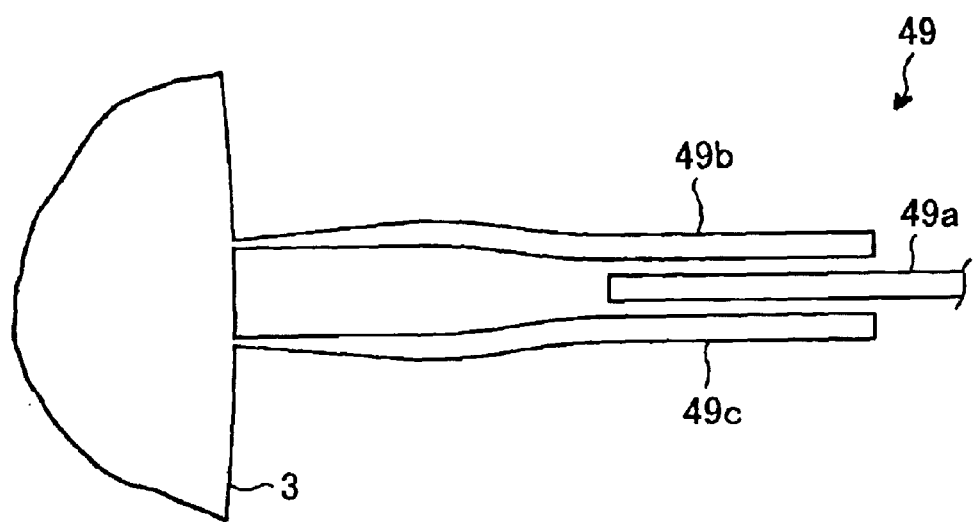
FIG. 19 is a view showing a thirteenth embodiment of a directional coupler applicable to the present invention.

FIG. 18 is a view showing a twelfth embodiment of a directional coupler applicable to the present invention. FIG. 19 is a view showing a thirteenth embodiment of a directional coupler applicable to the present invention.

A directional coupler 48 shown in FIG. 18 comprises a central waveguide 48a and arranged waveguides 48b and 48c arranged on both sides of the central waveguide 48a. The width of a core in each waveguide is uniform at a portion where the arranged waveguides 48b and 48c couple with the central waveguide 48a. Each of the arranged waveguides 48b and 48c is curved from the entrance of the central waveguide 48a to the end on the sector slab waveguide 3 side. The distance between the centers of the cores in the arranged waveguides 48b and 48c gradually narrows. These are the same with the eighth embodiment shown in FIG. 14. The structure of the directional coupler 48 shown in FIG. 18 differs from that of the eighth embodiment in that a taper is formed on both side portions of each of the arranged waveguides 48b and 48c so that the width of the core will gradually narrow in the direction of the end which connects with the sector slab waveguide 3.

On the other hand, a directional coupler 49 shown in FIG. 19 comprises a central waveguide 49a and arranged waveguides 49b and 49c arranged on both sides of the central waveguide 49a. The width of a core in each waveguide is uniform at a portion where the arranged waveguides 49b and 49c couple with the central waveguide 49a. Each of the arranged waveguides 49b and 49c is curved from the entrance of the central waveguide 49a to the end on the sector slab waveguide 3 side. The distance between the centers of the cores in the arranged waveguides 49b and 49c gradually narrows. These are the same with the ninth embodiment shown in FIG. 15. The structure of the directional coupler 49 shown in FIG. 19 differs from that of the ninth embodiment in that a taper is formed on both side portions of each of the arranged waveguides 49b and 49c so that the width of the core will gradually narrow in the direction of the end which connects with the sector slab waveguide 3.

In the directional coupler 48, the space between the central waveguide 48a and the sector slab waveguide 3 is wide and a portion on the sector slab waveguide 3 side of each of the arranged waveguides 48b and 48c is curved. As a result, the space between the waveguides connected to the sector slab waveguide 3 can be adjusted freely. In addition, the width of the core in each waveguide narrows at the end which connects with the sector slab waveguide 3. This may reduce connection loss. The same applies to the directional coupler 49.

Now, an example of a design for a directional coupler according to the twelfth embodiment shown in FIG. 18 will be given.

In this example, material for the waveguides, the thickness of a lower clad layer, core layer, and upper clad layer, the width of the core, and the difference in relative index between the core layer and lower clad layer and between the core layer and upper clad layer are the same with the above example of a design for a directional coupler according to the eighth embodiment. In the directional coupler 48, coupling length between the central waveguide 48a and arranged waveguide 48b and between the central waveguide 48a and arranged waveguide 48c are 900 $\mu$m. Each of the arranged waveguides 48b and 48c is a curved waveguide. The radius of the curvature of each of the arranged waveguides 48b and 48c is 8,000 $\mu$m. The distance between the centers of the cores in the arranged waveguides 48b and 48c is 16.4 $\mu$m at the portion where the arranged waveguides 48b and 48c couple with the central waveguide 48a, and is 10 $\mu$m at an interface between the arranged waveguides 48b and 48c and the sector slab waveguide 3. These are also the same with the above example of a design for a directional coupler according to the eighth embodiment.

The width of the core in each of the arranged waveguides 48b and 48c is 5.4 $\mu$m at the portion where it couples with the central waveguide 48a, and is 1.5 $\mu$m at the end, being the narrowest portion, which connects with the sector slab waveguide 3. Compared with the above example of a design for a directional coupler according to the eighth embodiment, connection loss which occurs at a portion where the directional coupler 48 and sector slab waveguide 3 connect is reduced by 0.3 dB by adopting the above structure. Therefore, compared with the conventional structure in which each waveguide (the width of a core is 5.4 $\mu$m) of the arrayed waveguide 4 is connected directly to the sector slab waveguide 3, connection loss is reduced by 3.5 dB.

In the directional coupler in each of the above fifth through thirteenth embodiments, one arranged waveguide is located on each side of the central waveguide. However, a larger number of arranged waveguides may be located on each side of the central waveguide. In that case, the same number of arranged waveguides must be located on each side of the central waveguide.

In an optical multiplexer/demultiplexer using an arrayed waveguide grating according to the present invention, it is possible to locate any one of the directional couplers according to the above first through fourth embodiments at the entrance of the sector slab waveguide 3 on the input side and to locate any one of the directional couplers according to the above fifth through thirteenth embodiments at the exit of the sector slab waveguide 3 on the input side.

This structure not only makes passband characteristics in the optical output waveguides 6 flat but reduces loss more greatly which occurs in light propagated.

Figure 20:
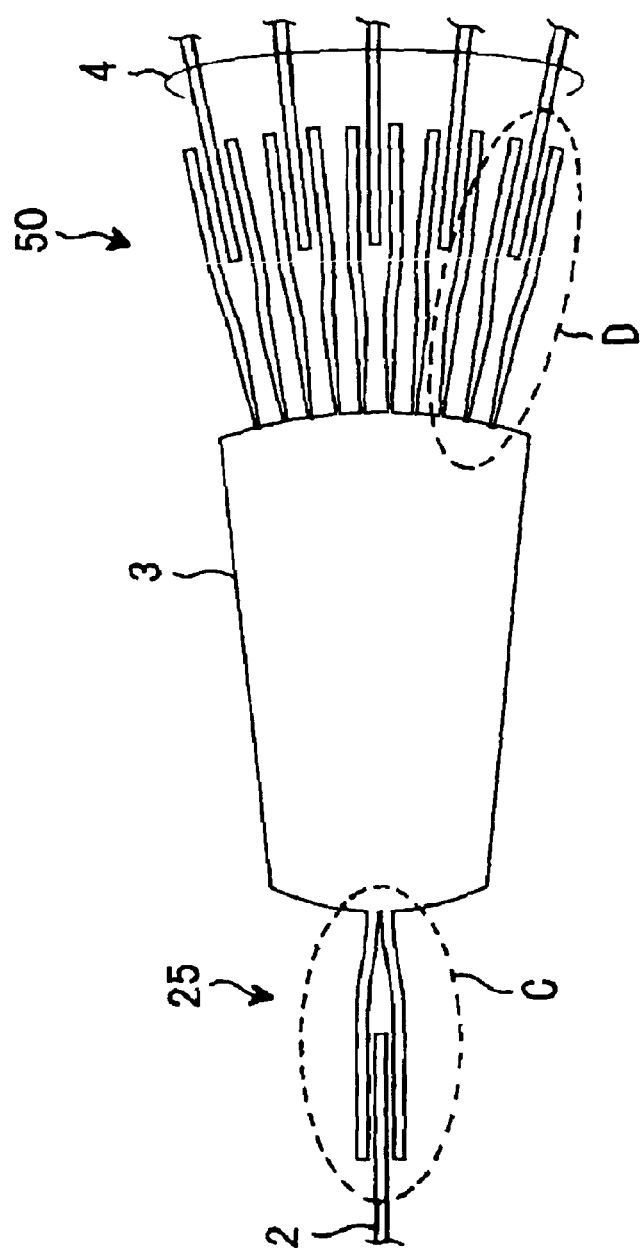
FIG. 20 is a view showing structure in the case of directional couplers being connected to both the entrance and exit of a sector slab waveguide.
Figure 21:
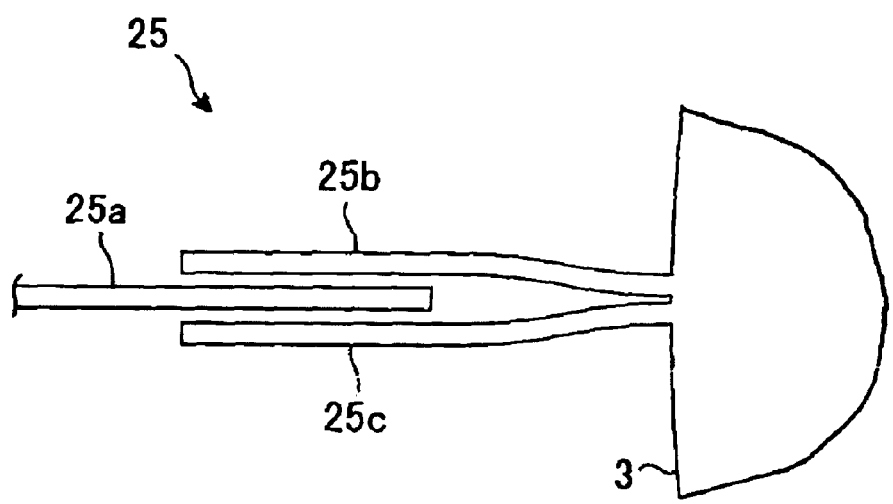
FIGS. 21(A) and 21(B) are views showing the structure of the directional couplers connected to the sector slab waveguide as shown in FIG. 20, FIG. 21(A) being an enlarged view of portion C shown in FIG. 20, FIG. 21(B) being an enlarged view of portion D shown in FIG. 20.
Figure 21:
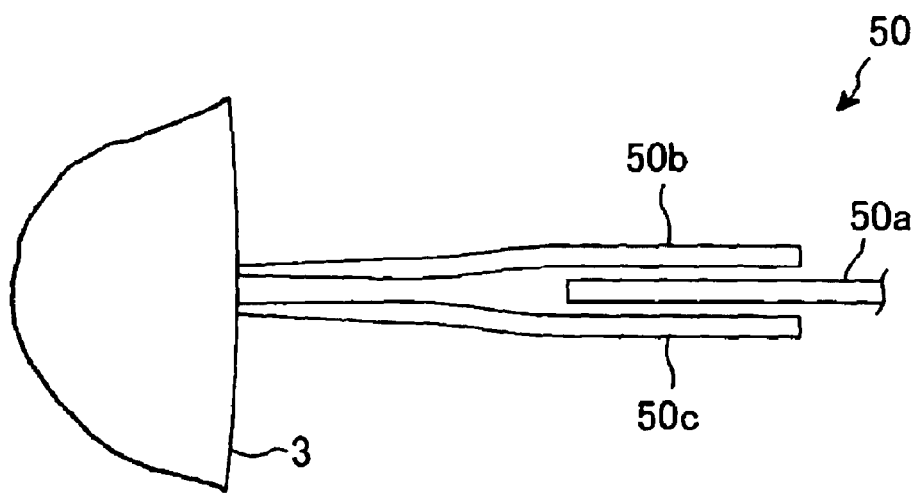
Figure 22:
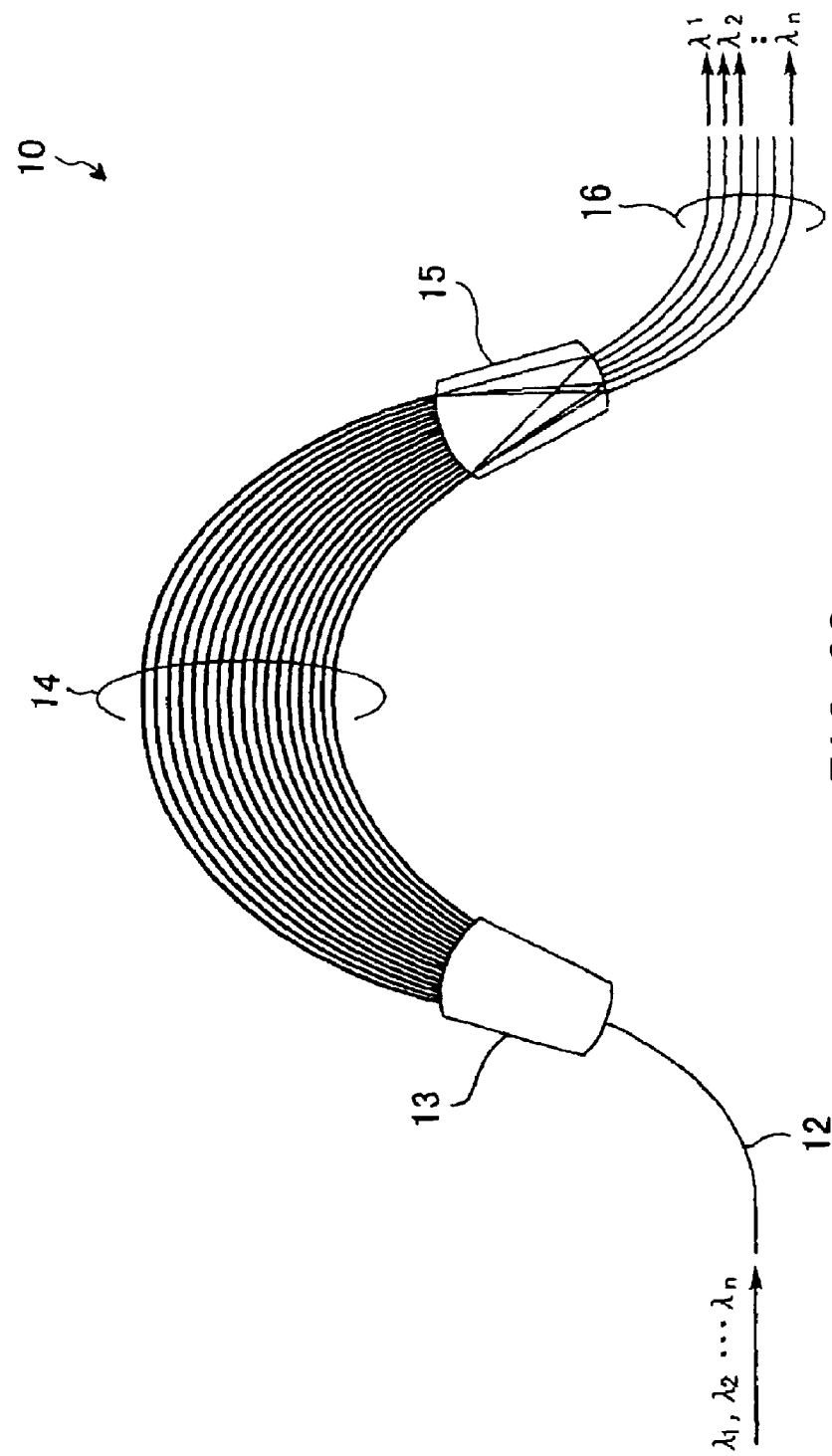
FIG. 22 is a view showing the structure of a conventional arrayed waveguide grating.
Figure 23:
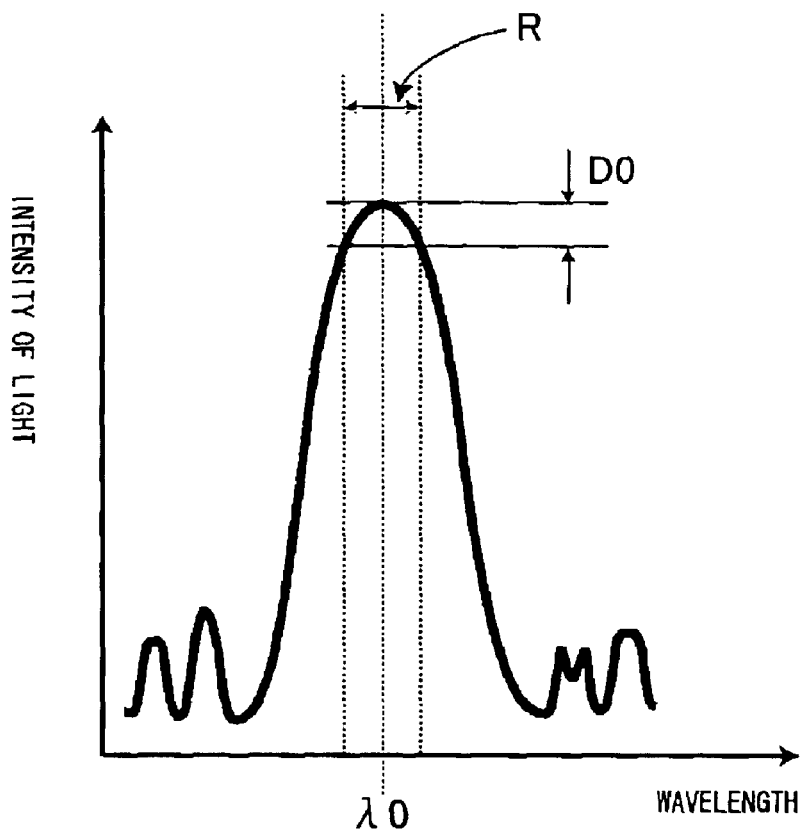
FIG. 23 is a graph showing an example of the passband characteristic of light demultiplexed in a conventional arrayed waveguide grating.
Figure 24:
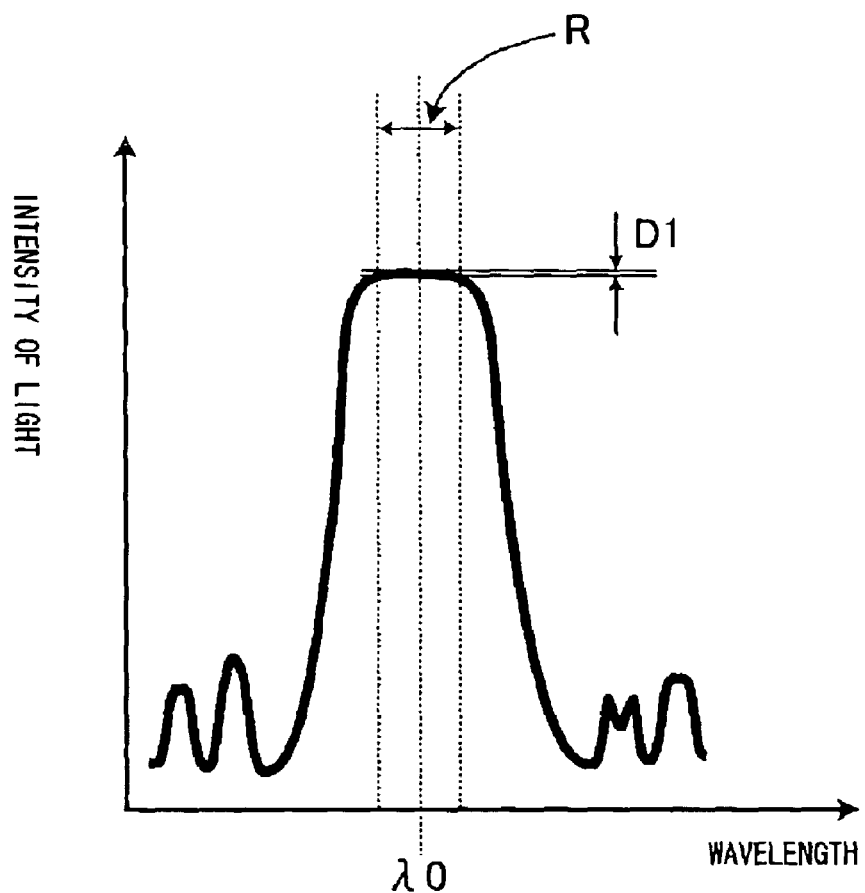
FIG. 24 is a graph showing an example in which a passband characteristic is made flat.
Figure 25:
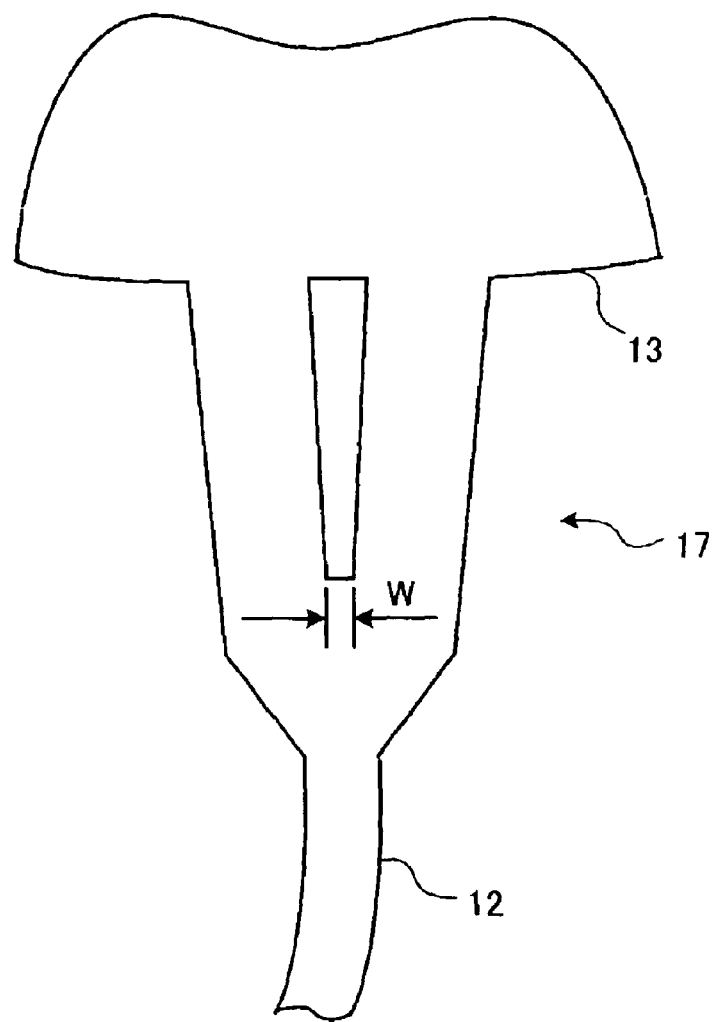
FIG. 25 is a view showing the structure of a Y branch circuit.
Figure 26:
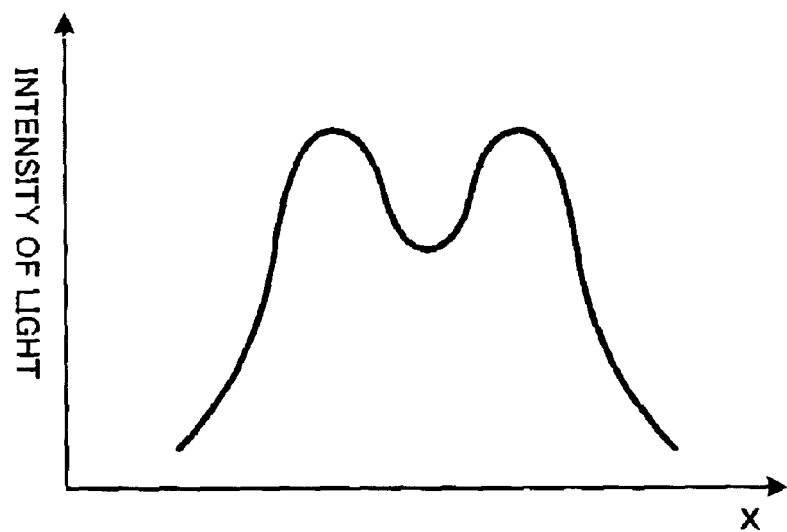
FIG. 26 is a schematic view showing the shape of a mode of light output from the Y branch circuit to a sector slab waveguide.
Figure 27:
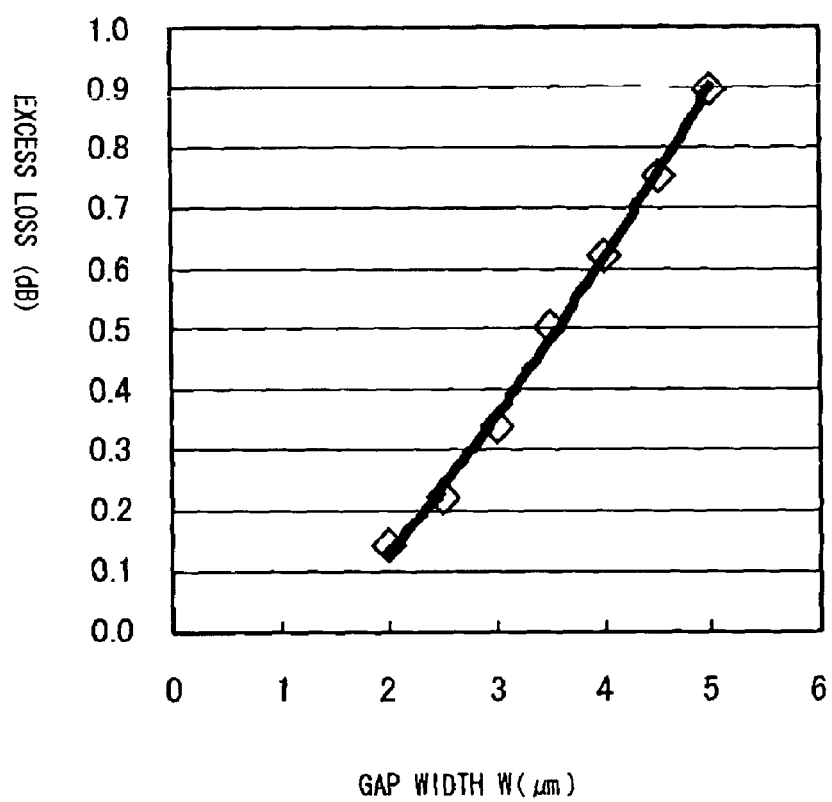
FIG. 27 is a graph showing the relationship between gap width W and excess loss in a Y branch circuit.

Now, an example of this structure will be given. FIG. 20 is a view showing structure in the case of directional couplers being connected to both the entrance and exit of the sector slab waveguide 3. FIGS. 21(A) and 21(B) are views showing the structure of the directional couplers connected to the sector slab waveguide 3.

As shown in FIG. 20, in this example, the optical input waveguide 2 and sector slab waveguide 3 are connected by a directional coupler 25 and the sector slab waveguide 3 and each waveguide of the arrayed waveguide 4 are connected by a directional coupler 50.

FIG. 21(A) is an enlarged view of portion C shown in FIG. 20. As shown in FIG. 21(A), the structure of the directional coupler 25 is the same as that of the third embodiment shown in FIG. 7. That is to say, the directional coupler 25 has a basic structure comprising a central waveguide 25a including the exit of the optical input waveguide 2 and arranged waveguides 25b and 25c arranged on the both sides of the central waveguide 25a. The width of a core in the central waveguide 25a is uniform. Moreover, the exit of the central waveguide 25a is located so that it will not touch the sector slab waveguide 3.

The width of a core in each of the arranged waveguides 25b and 25c is uniform. The end portions on the optical input waveguide 2 side of the arranged waveguides 25b and 25c are arranged on both sides of the central waveguide 25a to form an optical coupling portion. Each of the arranged waveguides 25b and 25c is gently curved from the exit of the central waveguide 25a to the end on the sector slab waveguide 3 side. The space between the arranged waveguides 25b and 25c gradually narrows in the direction of their ends and they are connected to the entrance of the sector slab waveguide 3.

FIG. 21(B) is an enlarged view of portion D shown in FIG. 20. As shown in FIG. 21(B), the structure of the directional coupler 50 is the same as that of the twelfth embodiment shown in FIG. 18. That is to say, the directional coupler 50 comprises a central waveguide 50a including the entrance of each waveguide of the arrayed waveguide 4 and arranged waveguides 50b and 50c arranged on both sides of the central waveguide 50a. The width of a core in each waveguide is uniform at a portion where the arranged waveguides 50b and 50c couple with the central waveguide 50a. Each of the arranged waveguides 50b and 50c is curved from the entrance of the central waveguide 50a to the end on the sector slab waveguide 3 side. The distance between the centers of the cores in the arranged waveguides 50b and 50c gradually narrows. A taper is formed on both side portions of each of the arranged waveguides 50b and 50c so that the width of the core will gradually narrow in the direction of the end which connects with the sector slab waveguide 3.

In this example, by locating the directional coupler 25, loss is reduced, compared with a conventional Y branch circuit, and passband characteristics in the optical output waveguides 6 can be made flat properly. In addition, by locating the directional coupler 50, connection loss which occurs between the sector slab waveguide 3 and the arrayed waveguide 4 can be reduced significantly.

For example, if the examples of a design given in the above third and twelfth embodiments are applied, then loss which occurs in the directional coupler 25 is smaller by 0.3 dB than loss which occurs in a conventional Y branch circuit. In addition, compared with a case where the arrayed waveguide 4 is connected directly to the sector slab waveguide 3, loss is reduced by 3.5 dB by locating the directional coupler 50.

As has been described in the foregoing, with the optical multiplexer/demultiplexer according to the present invention a taper is formed on both side portions of the central waveguide in the directional coupler 21 which connects the optical input waveguide and the first sector slab waveguide to gradually narrow the width of the central waveguide in the direction of the exit. Accordingly, the space between the arranged waveguides at the exits where the arranged waveguides and the first sector slab waveguide connect is narrowed. The distance between two peaks which appear in the shape of a mode of output light varies according to the angle of the taper formed on the central waveguide. Therefore, loss can be reduced and proper passband characteristics can be obtained.

Moreover, with the optical multiplexer/demultiplexer according to the present invention a plurality of arranged waveguides in the directional coupler are connected to the entrance of each waveguide of the arrayed waveguide. As a result, the number of waveguides connected to the exit of the first sector slab waveguide increases. Therefore, the shape of a mode of the plurality of arranged waveguides becomes more similar to that of a mode of light in the first sector slab waveguide and connection loss is reduced.

Furthermore, with the optical multiplexer/demultiplexer according to the present invention a taper is formed on both side portions of the first central waveguide in the first directional coupler 21 which connects the optical input waveguide and the first sector slab waveguide to gradually narrow the width of the first central waveguide in the direction of the exit. Accordingly, the space between the first arranged waveguides at the exits where the first arranged waveguides and the first sector slab waveguide connect is narrowed. As a result, the distance between two peaks which appear in the shape of a mode of output light varies according to the angle of the taper formed on the first central waveguide. In addition, the plurality of second arranged waveguides in the second directional coupler are connected to the entrance of each waveguide of the arrayed waveguide. As a result, the number of waveguides connected to the exit of the first sector slab waveguide increases. Therefore, the shape of a mode of the plurality of second arranged waveguides becomes more similar to that of a mode of light in the first sector slab waveguide. Accordingly, proper passband characteristics can be obtained and loss which occurs between the optical input waveguide and the first sector slab waveguide and between the first sector slab waveguide and the arrayed waveguide can be reduced.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical multiplexer/demultiplexer having a waveguide structure, the structure comprising:

one or more optical input waveguides arranged;

a first sector slab waveguide located on the output side of the optical input waveguides;

an arrayed waveguide including a plurality of waveguides arranged any adjacent two of which differ in length by a constant value for propagating light output from the first sector slab waveguide;

a second sector slab waveguide connected to the output side of the arrayed waveguide; and a plurality of optical output waveguides arranged and connected to the output side of the second sector slab waveguide, wherein the optical input waveguides and the first sector slab waveguide are connected by a directional coupler having a symmetrical structure, the coupler comprising:

a central waveguide including an end portion on the first sector slab waveguide side of the optical input waveguides on both side portions of which a taper is formed so that the width of a core will gradually narrow in the direction of the end portion, and not touching the first sector slab waveguide; and a plurality of arranged waveguides one end of each of which is connected to the input side of the first sector slab waveguide and which are arranged on both sides of the central waveguide by the same numbers.

2. The optical multiplexer/demultiplexer according to claim 1, wherein the width of a core in each of the plurality of arranged waveguides is uniform and the plurality of arranged waveguides are located parallel to the taper on the central waveguide.

3. The optical multiplexer/demultiplexer according to claim 1, wherein each of the plurality of arranged waveguides is formed so that the width of a core in each of the plurality of arranged waveguides will gradually widen in the direction of an end of each of the plurality of arranged waveguides which connects with the first sector slab waveguide.

4. An optical multiplexer/demultiplexer having a waveguide structure, the structure comprising:

one or more optical input waveguides arranged;

a first sector slab waveguide located on the output side of the optical input waveguides;

an arrayed waveguide including a plurality of waveguides arranged any adjacent two of which differ in length by a constant value for propagating light output from the first sector slab waveguide;

a second sector slab waveguide connected to the output side of the arrayed waveguide; and a plurality of optical output waveguides arranged and connected to the output side of the second sector slab waveguide, wherein the optical input waveguides and the first sector slab waveguide are connected by a directional coupler having a symmetrical structure, the coupler comprising:

a central waveguide including an end portion on the first sector slab waveguide side of the optical input waveguides and not touching the first sector slab waveguide; and a plurality of arranged waveguides in each of which the width of a core is uniform, a portion of a predetermined length from an end on the input side of the central waveguide of each of which is arranged with the central waveguide, which are formed so that the distance between any two opposite to each other with the central waveguide will gradually narrow or widen in the direction of the other ends, the other ends of which are connected to the input side of the first sector slab waveguide, and which are located on both sides of the central waveguide by the same numbers.

5. An optical multiplexer/demultiplexer having a waveguide structure, the structure comprising:

one or more optical input waveguides arranged;

a first sector slab waveguide connected to the output side of the optical input waveguides;

an arrayed waveguide including a plurality of waveguides arranged any adjacent two of which differ in length by a constant value for propagating light output from the first sector slab waveguide;

a second sector slab waveguide connected to the output side of the arrayed waveguide; and a plurality of optical output waveguides arranged and connected to the output side of the second sector slab waveguide, wherein the first sector slab waveguide and the arrayed waveguide are connected by a directional coupler having a symmetrical structure, the coupler comprising:

a central waveguide including an end portion on the first sector slab waveguide side of each of the plurality of waveguides included in the arrayed waveguide and not touching the first sector slab waveguide; and a plurality of arranged waveguides one end of each of which is connected to the output side of the first sector slab waveguide and which are arranged on both sides of the central waveguide by the same numbers.

6. The optical multiplexer/demultiplexer according to claim 5, wherein the central waveguide includes an end portion on the first sector slab waveguide side of each of the plurality of waveguides included in the arrayed waveguide on both side portions of which a taper is formed so that the width of a core will gradually narrow in the direction of the end portion; and the width of a core in each of the plurality of arranged waveguides is uniform and the plurality of arranged waveguides are located parallel to the taper on the central waveguide.

7. The optical multiplexer/demultiplexer according to claim 5, wherein the central waveguide includes an end portion on the first sector slab waveguide side of each of the plurality of waveguides included in the arrayed waveguide on both side portions of which a taper is formed so that the width of a core will gradually narrow in the direction of the end portion; and each of the plurality of arranged waveguides is formed so that the width of a core in each of the plurality of arranged waveguides will gradually widen in the direction of an end of each of the plurality of arranged waveguides which connects with the first sector slab waveguide.

8. The optical multiplexer/demultiplexer according to claim 5, wherein a portion of a predetermined length from an end on the output side of the central waveguide of each of the plurality of arranged waveguides is arranged with the central waveguide and the plurality of arranged waveguides are formed so that the distance between the centers of cores in any two arranged waveguides opposite to each other with the central waveguide will gradually narrow or widen in the direction of the other ends.

9. The optical multiplexer/demultiplexer according to claim 8, wherein the width of a core in each of the plurality of arranged waveguides is uniform.

10. The optical multiplexer/demultiplexer according to claim 8, wherein the plurality of arranged waveguides are formed so that the width of a core in the portion of each of the plurality of arranged waveguides which is arranged with the central waveguide will be uniform and so that the width of a core in each of the plurality of arranged waveguides will gradually widen or narrow in the direction of an end of each of the plurality of arranged waveguides which connects with the first sector slab waveguide.

11. An optical multiplexer/demultiplexer having a waveguide structure, the structure comprising:

one or more optical input waveguides arranged;

a first sector slab waveguide located on the output side of the optical input waveguides;

an arrayed waveguide including a plurality of waveguides arranged any adjacent two of which differ in length by a constant value for propagating light output from the first sector slab waveguide;

a second sector slab waveguide connected to the output side of the arrayed waveguide; and a plurality of optical output waveguides arranged and connected to the output side of the second sector slab waveguide, wherein the optical input waveguides and the first sector slab waveguide are connected by a first directional coupler having a symmetrical structure, the coupler comprising:

a first central waveguide including an end portion on the first sector slab waveguide side of the optical input waveguides on both side portions of which a taper is formed so that the width of a core will gradually narrow in the direction of the end portion, and not touching the first sector slab waveguide, and a plurality of first arranged waveguides one end of each of which is connected to the input side of the first sector slab waveguide and which are arranged on both sides of the first central waveguide by the same numbers; and the first sector slab waveguide and the arrayed waveguide are connected by a second directional coupler having a symmetrical structure, the coupler comprising:

a second central waveguide including an end portion on the first sector slab waveguide side of each of the plurality of waveguides included in the arrayed waveguide and not touching the first sector slab waveguide, and a plurality of second arranged waveguides one end of each of which is connected to the output side of the first sector slab waveguide and which are arranged on both sides of the second central waveguide by the same numbers.

12. An optical multiplexer/demultiplexer having a waveguide structure, the structure comprising:

one or more optical input waveguides arranged;

a first sector slab waveguide located on the output side of the optical input waveguides;

an arrayed waveguide including a plurality of waveguides arranged any adjacent two of which differ in length by a constant value for propagating light output from the first sector slab waveguide;

a second sector slab waveguide connected to the output side of the arrayed waveguide; and a plurality of optical output waveguides arranged and connected to the output side of the second sector slab waveguide, wherein the optical input waveguides and the first sector slab waveguide are connected by a first directional coupler having a symmetrical structure, the coupler comprising:

a first central waveguide including an end portion on the first sector slab waveguide side of the optical input waveguides and not touching the first sector slab waveguide, and a plurality of first arranged waveguides in each of which the width of a core is uniform, a portion of a predetermined length from an end on the input side of the first central waveguide of each of which is arranged with the first central waveguide, which are formed so that the distance between any two opposite to each other with the first central waveguide will gradually narrow or widen in the direction of the other ends, the other ends of which are connected to the input side of the first sector slab waveguide, and which are located on both sides of the first central waveguide by the same numbers; and the first sector slab waveguide and the arrayed waveguide are connected by a second directional coupler having a symmetrical structure, the coupler comprising:

a second central waveguide including an end portion on the first sector slab waveguide side of each of the plurality of waveguides included in the arrayed waveguide and not touching the first sector slab waveguide, and a plurality of second arranged waveguides one end of each of which is connected to the output side of the first sector slab waveguide and which are arranged on both sides of the second central waveguide by the same numbers.

* * * * *